US008904103B2

(12) United States Patent
Taniyama

(10) Patent No.: US 8,904,103 B2
(45) Date of Patent: Dec. 2, 2014

(54) DATA PROCESSING APPARATUS AND METHOD FOR RECORDING DATA

(75) Inventor: Yukio Taniyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 13/291,484

(22) Filed: Nov. 8, 2011

(65) Prior Publication Data

US 2012/0166752 A1 Jun. 28, 2012

(30) Foreign Application Priority Data

Dec. 24, 2010 (JP) ................................. 2010-287478

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/0608* (2013.01); *G06F 3/0686* (2013.01); *G06F 3/0643* (2013.01); *G06F 3/0664* (2013.01); *G06F 2212/401* (2013.01); *G06F 3/064* (2013.01)
USPC ............. 711/111; 707/654; 707/693; 710/68; 711/114; 711/147; 711/170; 711/172

(58) Field of Classification Search
CPC .................................................. G06F 3/0686
USPC ......................................................... 711/172
See application file for complete search history.

(56) References Cited

U.S. PATENT DOCUMENTS 5,235,695 A * 8/1993 Pence ............................ 711/172
5,333,277 A * 7/1994 Searls ............................ 710/300
5,438,674 A * 8/1995 Keele et al. ....................... 711/4
5,813,011 A * 9/1998 Yoshida et al. ...................... 1/1
5,915,129 A * 6/1999 Slivka et al. ..................... 710/68

(Continued)

FOREIGN PATENT DOCUMENTS

JP 04-242424 8/1992
JP 2002-259257 9/2002

(Continued)

OTHER PUBLICATIONS

Data stream definition, McGraw-Hill Dictionary of Scientific and Technical Terms, 6E, 2003.*

(Continued)

*Primary Examiner* — Sanjiv Shah
*Assistant Examiner* — Daniel C Chappell
(74) *Attorney, Agent, or Firm* — Staas & Halsey LLP

(57) ABSTRACT

A data processing apparatus includes a calculating unit configured to calculate a compression ratio when a block selected from among the plurality of blocks is compressed; a determining unit configured to determine whether a block is to be compressed by comparing the calculated compression ratio with a threshold; a recording unit configured to record the block on the storage device in a compressed or uncompressed state on a basis of a result of the determination; a management information creating unit configured to create a management information in association with data identification information for identifying the data, state information indicating a compressed or uncompressed state is recorded to the management information in association with each block, when the each block is recorded on the storage device; and a storage processing unit configured to store the management information created by the management information creating unit on a memory.

7 Claims, 18 Drawing Sheets

(56) References Cited

U.S. PATENT DOCUMENTS

| | | | |
|---|---|---|---|
| 6,006,276 A * | 12/1999 | MacCormack et al. | 709/253 |
| 6,092,071 A * | 7/2000 | Bolan et al. | 1/1 |
| 6,138,201 A * | 10/2000 | Rebalski | 711/4 |
| 6,192,432 B1 * | 2/2001 | Slivka et al. | 710/68 |
| 6,317,747 B1 * | 11/2001 | Bolan et al. | 1/1 |
| 6,615,365 B1 * | 9/2003 | Jenevein et al. | 714/6.11 |
| 6,956,507 B2 * | 10/2005 | Castelli et al. | 341/50 |
| 7,039,769 B2 * | 5/2006 | Castelli et al. | 711/147 |
| 7,308,528 B2 * | 12/2007 | Kitamura et al. | 711/111 |
| 7,437,492 B2 * | 10/2008 | Stager et al. | 710/68 |
| 7,568,067 B1 * | 7/2009 | Mase et al. | 711/111 |
| 7,711,876 B2 * | 5/2010 | Shotwell et al. | 710/68 |
| 7,747,816 B1 * | 6/2010 | Nourmohamadian et al. | 711/111 |
| 7,765,377 B2 * | 7/2010 | Friauf et al. | 711/170 |
| 7,788,299 B2 * | 8/2010 | Fenske et al. | 707/812 |
| 7,853,750 B2 * | 12/2010 | Stager | 711/112 |
| 7,860,843 B2 * | 12/2010 | Dodd et al. | 707/693 |
| 7,987,161 B2 * | 7/2011 | Williams et al. | 707/693 |
| 8,041,672 B2 * | 10/2011 | Ogawa et al. | 707/609 |
| 8,117,501 B2 * | 2/2012 | Taniyama et al. | 714/42 |
| 8,520,011 B2 * | 8/2013 | Toriyama | 345/502 |
| 8,533,166 B1 * | 9/2013 | Sulieman et al. | 707/693 |
| 8,538,174 B2 * | 9/2013 | Hama et al. | 382/232 |
| 8,566,286 B1 * | 10/2013 | Hawton et al. | 707/654 |
| 8,656,094 B2 * | 2/2014 | Peake | 711/111 |
| 2004/0230724 A1 * | 11/2004 | Stager et al. | 710/68 |
| 2005/0086428 A1 * | 4/2005 | Taniyama | 711/111 |
| 2008/0034268 A1 * | 2/2008 | Dodd et al. | 714/755 |
| 2008/0141039 A1 * | 6/2008 | Matze | 713/193 |
| 2008/0172525 A1 | 7/2008 | Nakamura et al. | |
| 2009/0055422 A1 * | 2/2009 | Williams et al. | 707/101 |
| 2009/0322958 A1 * | 12/2009 | Toriyama | 348/714 |
| 2010/0192019 A1 * | 7/2010 | Taniyama et al. | 714/37 |
| 2011/0087640 A1 * | 4/2011 | Dodd et al. | 707/693 |
| 2011/0205565 A1 * | 8/2011 | Yamada | 358/1.9 |
| 2011/0276754 A1 * | 11/2011 | Bish et al. | 711/111 |
| 2012/0124285 A1 * | 5/2012 | Soran et al. | 711/114 |
| 2012/0166752 A1 * | 6/2012 | Taniyama | 711/170 |
| 2012/0239877 A1 * | 9/2012 | Peake | 711/111 |
| 2012/0287141 A1 * | 11/2012 | Higgins et al. | 345/581 |
| 2012/0310890 A1 * | 12/2012 | Dodd et al. | 707/646 |

FOREIGN PATENT DOCUMENTS

| | | | | |
|---|---|---|---|---|
| JP | 2003-308269 | | 10/2003 | |
| JP | 2005-099971 | | 4/2005 | |
| JP | 2005099971 | * | 4/2005 | ............... G06F 3/06 |
| JP | 2005-122433 | | 5/2005 | |
| JP | 2008-129678 | | 6/2008 | |
| JP | 2008-152778 | | 7/2008 | |
| JP | 2008-171312 | | 7/2008 | |
| JP | 2010-079535 | | 4/2010 | |

OTHER PUBLICATIONS

Japanese Notification of Reasons for Refusal dated May 7, 2014 in Japanese Patent Application No. 2010-287478.

* cited by examiner

FIG. 5

| Field | Size |
|---|---|
| LABEL IDENTIFICATION SYMBOL | (4) |
| FILE NAME | (17) |
| FILE SERIAL NUMBER | (6) |
| VOLUME ORDER | (4) |
| FILE ORDER | (4) |
| ZERO | (6) |
| CREATION DATE | (6) |
| EXPIRY DATE | (6) |
| ZERO | (1) |
| BLOCK COUNT | (6) |
| BLANK | (20) |

FIG. 7A

| VOL | HDR1 | HDR2 | COMPRESSED (1) | COMPRESSED (2) | UNCOMPRESSED (3) | ----- | UNCOMPRESSED (n-1) | UNCOMPRESSED (n) | EOF1 | EOF2 |

FIG. 7B

| VOLUME NAME | FILE NAME | COMPRESSED/UNCOMPRESSED STATE | PATROL POINTER | LAST BLOCK |
|---|---|---|---|---|
| VOLAAA | HDRAAA | 0011111...1111 | 3 | n |
|  |  |  |  |  |

↙ T

COMPRESSED/UNCOMPRESSED HISTORY: UNCOMPRESSED = 1, COMPRESSED = 0

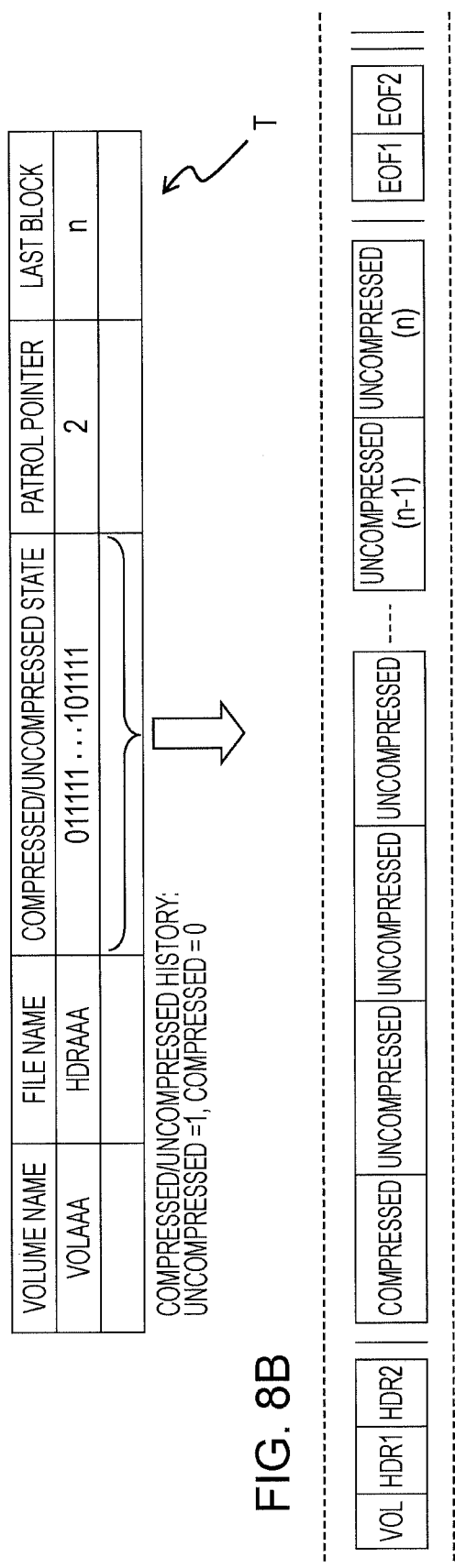

DATA PROCESSING APPARATUS AND METHOD FOR RECORDING DATA

CROSS-REFERENCE TO RELATED APPLICATION

This application is based upon and claims the benefit of priority of the prior Japanese Patent Application No. 2010-287478, filed on Dec. 24, 2010, the entire contents of which are incorporated herein by reference.

FIELD

The disclosure herein relates to a data processing apparatus and a method for recording data.

BACKGROUND

A virtual tape library (VTL) is a system in which a tape drive is virtually implemented on a disk device so as to appear to a high-order apparatus, such as a host computer, as if the tape drive were connected (refer to, for example, Japanese Laid-open Patent Publication No. 2005-122433). In the technology of the virtual tape library, data is written for each block to the disk device.

The virtual tape library can be easily implemented without making significant changes to the operation of a legacy physical tape library. In addition, the virtual tape library can speed up processing, such as backup.

In the virtual tape library, data may also be compressed when it is written to a disk device or tape drive (refer to, for example, Japanese Laid-open Patent Publication Nos. 2005-99971 and 2008-152778). In the known data compression schemes for the virtual disk library, a data compression/uncompression determination is made for each file. For example, the first one of blocks in the data field of a file is compressed and the compression residue ratio of the compressed block is compared with a predetermined threshold. When the compression residue ratio is lower than or equal to the threshold, all of the blocks included in the file are compressed and recorded to a storage device.

The term "compression residue ratio" as used herein refers to the ratio (percentage) of the size of compressed data to the size of uncompressed data and is also called a "compression ratio". A smaller numeric value of the compression residue ratio indicates that the size of compressed data is smaller and the compression efficiency is higher.

FIG. 18 illustrates a compression residue ratio versus processing time. As illustrated in FIG. 18, the time needed to process a compressed block includes data transfer time and compression/decompression time.

The data transfer time is the time needed for transferring data and is proportional to the data size. The compression/decompression time is the time needed for compressing/decompressing the data and includes, for example, the time for creating/storing a dictionary table used for compression/decompression and the time for referring to the dictionary table. The compression/decompression time is constant, regardless of the data size.

Accordingly, there is a problem in that compressed data whose compression residual ratio exceeds a specific value (90% in the example illustrated in FIG. 18) needs a longer processing time than the processing time for a case in which the data is recorded to an uncompressed state that does not need the compression/decompression time.

In addition, for the compressed data, accompanying information, such as a compression dictionary, also needs to be recorded. Thus, when the compression residual ratio exceeds the specific value (e.g., 90%), the amount of data increases compared to a case in which the data is recorded uncompressed.

SUMMARY

According to one aspect of the present invention, a data processing apparatus includes a calculating unit configured to calculate a compression ratio when a block selected from among the plurality of blocks is compressed; a determining unit configured to determine whether a block is to be compressed by comparing the calculated compression ratio with a threshold; a recording unit configured to record the block on the storage device in a compressed or uncompressed state on a basis of a result of the determination; a management information creating unit configured to create a management information in association with data identification information for identifying the data, state information indicating a compressed or uncompressed state is recorded to the management information in association with each block, when the each block is recorded on the storage device; and a storage processing unit configured to store the management information created by the management information creating unit on a memory.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 illustrates a tape format for use in the virtual tape library system according to one example of the embodiment;

FIGS. 7A and 7B illustrate a management table in the virtual tape library system according to one example of the embodiment;

FIGS. 8A and 8B illustrate write processing using the management table in the virtual tape library system according to one example of the embodiment;

DESCRIPTION OF EMBODIMENTS

A virtual tape library system according to an embodiment will be described below with reference to the accompanying drawings.

Figure 1:
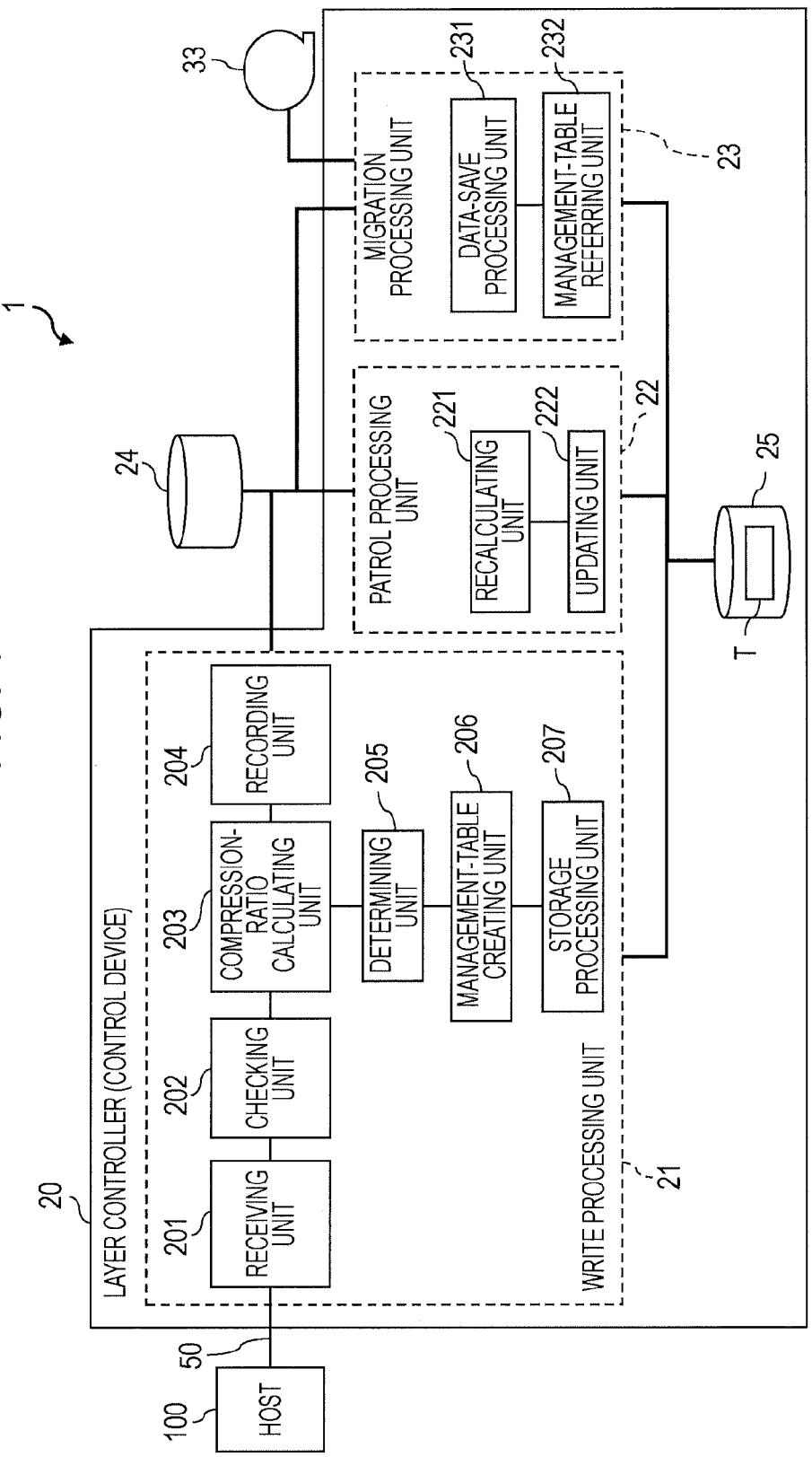
FIG. 1 is a block diagram schematically illustrating a functional configuration of a virtual tape library system according to one example of an embodiment.
Figure 2:
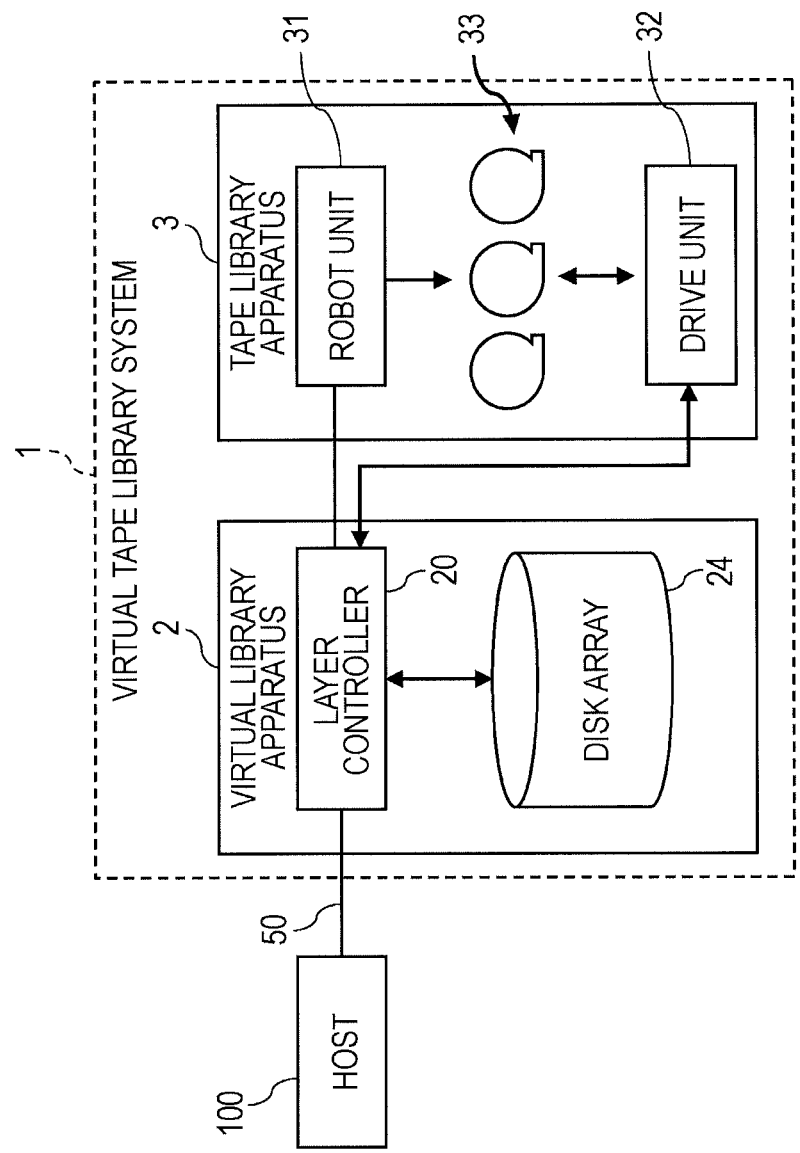
FIG. 2 is block diagram of a hardware configuration of the virtual tape library system according to one example of the embodiment.

FIG. 1 is a block diagram schematically illustrating a functional configuration of a virtual tape library system according to one example of an embodiment. FIG. 2 is a block diagram illustrating the hardware of the virtual tape library system.

A virtual tape library system 1 includes a disk array (a storage device) 24 on which tape operations are virtually realized.

As illustrated in FIG. 2, the virtual tape library system 1 includes a virtual library apparatus 2 and a tape library apparatus 3. The virtual tape library system 1 is coupled to a host 100, which is a high-order apparatus, through a communications line 50 so as to allow communication and stores data, transmitted from the host 100, onto the disk array 24.

In the virtual tape library system 1, data transmitted from the host 100 is stored in the disk array 24 in a tape format. For example, various types of data used by the host 100 are stored in the disk array 24 as a data backup job of the host 100. Through migration processing described below, the data stored in the disk array 24 is moved (saved) to a recording tape 33 in the tape library apparatus 3, as needed.

The host 100 has, for example, a function of a backup server and executes a pre-scheduled backup job. For the backup job, the host 100 transmits data (backup data) to be stored to the virtual library apparatus 2 and the backup data is stored in the disk array 24 in the virtual library apparatus 2. The backup data is given a predetermined file name for each job. For example, for backup for every day of the week, backup data for the same day of the week is given the same file name.

In general, for a routine job such as a backup job, when the file name of one file matches, the number of blocks included in the data field of the data and the compressed/uncompressed data properties thereof tend to mostly match the other file.

Those backup data given the same file name are processed in a predetermined order and in a predetermined volume at the same or substantially the same storage location in the disk array 24.

The tape library apparatus 3 includes a robot unit 31, a recording tape 33, and a drive unit 32. The tape library apparatus 3 records data, sent from the virtual library apparatus 2, to the recording tape 33 or reads data recorded on the recording tape 33 and sends the read data to the virtual library apparatus 2.

The recording tape 33 is a recording medium that allows sequential data access and storage and is, for example, a magnetic tape, a cartridge tape, or a cassette tape. In the example illustrated in FIG. 2, multiple recording tapes 33 are placed in the tape library apparatus 3.

The robot unit 31 has a mechanism for holding and transporting the recording tape 33 by using an arm (not illustrated) or the like. The robot unit 31 transports the recording tape 33 and places it into the drive unit 32. More specifically, under the control of a layer controller 20 in the virtual library apparatus 2, the robot unit 31 selects one of the recording tapes 33. The robot unit 31 then transports the selected recording tape 33 and places it into the drive unit 32.

The drive unit 32 writes/reads data to/from the recording tape 33. The drive unit 32 writes data in a tape format to the recording tape 33 placed by the robot unit 31.

The virtual tape library system 1 also has a migration function for moving data, stored in the disk array 24 in the virtual library apparatus 2, to the recording tape 33 in the tape library apparatus 3.

The virtual library apparatus 2 includes the layer controller 20 and the disk array 24. The virtual library apparatus 2 is provided between the host 100 and the tape library apparatus 3 to store data, transmitted from the host 100, into a logical tape volume in the disk array 24 in the tape format.

It is desired that the tape format used by the virtual tape library system 1 be a tape format standardized by ISO (International Organization for Standardization), ANSI (American National Standards Institute), JIS (Japanese Industrial Standards), or the like.

Figure 3:
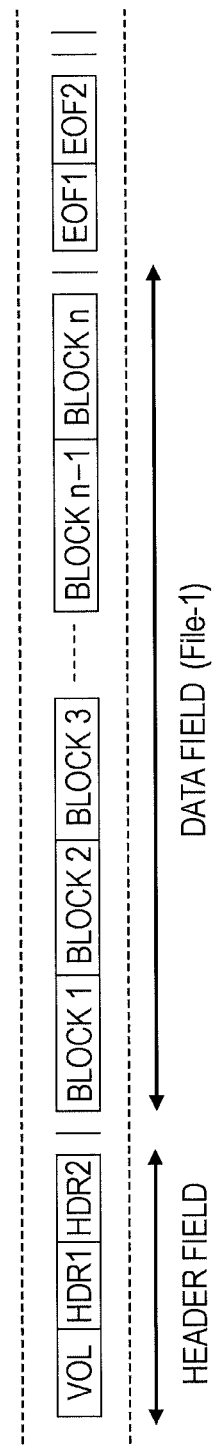
FIG. 3 illustrates a tape format for use in the virtual tape library system according to one example of the embodiment.
Figure 4:
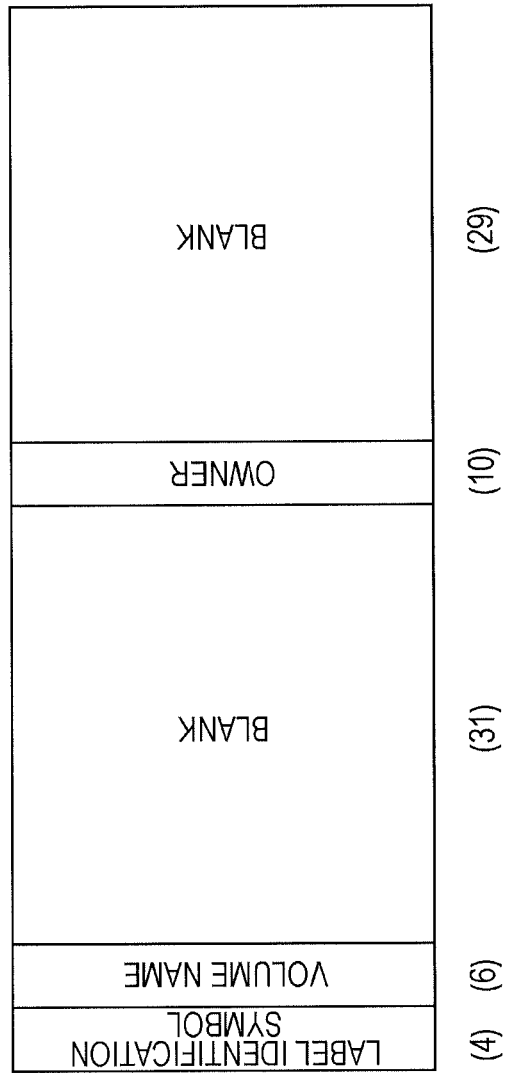
FIG. 4 illustrates a tape format for use in the virtual tape library system according to one example of the embodiment.
Figure 6:
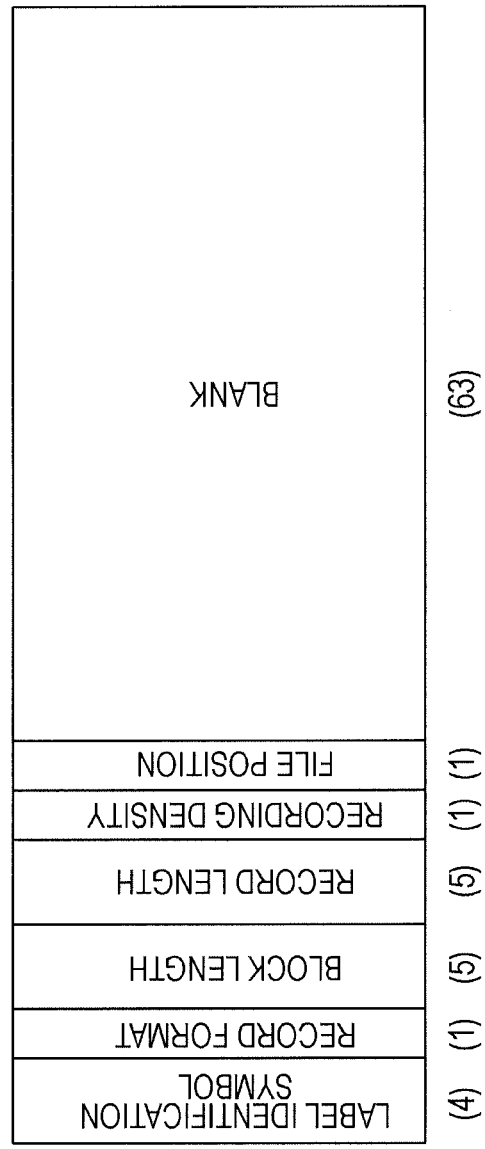
FIG. 6 illustrates a tape format for use in the virtual tape library system according to one example of the embodiment.

FIGS. 3 to 6 illustrate the tape format used by the virtual tape library system 1. More specifically, FIG. 3 illustrates a volume format of the tape format, FIG. 4 illustrates volume labels in the volume format, and FIGS. 5 and 6 illustrate file labels in the volume format. In FIGS. 4 to 6, numeral in bracket "( )" represents the number of bytes.

As illustrated in FIG. 3, in the tape format, data is recorded for each block (data block) in a data field. For writing/reading data, those blocks are processed in sequence from the first position.

In the example illustrated in FIG. 4, a label identification symbol is a 4-byte character string and is, for example, "VOL1". A volume name is a 6-byte character string and is, for example, "AAAAAA". An owner is a 10-byte character string and is, for example, "FUJITSU-FS".

In the example illustrated in FIG. 5, a label identification symbol is a 4-byte character string and is, for example, "HDR1". A file name is also a 17-byte character string and is, for example, "DATA-COMP-FILE". A file serial number is a 6-byte character string and is, for example, "123456". A volume order is a 4-byte character string and is, for example, "0001", "0002", . . . , "9999". A file order is a 4-byte character string and is, for example, "0001", "0002", . . . , "9999". A creation date is an 8-byte character string and is, for example, "20100506". An expiration date is a 6-byte character string and is, for example, "200506". A block count is a 6-byte character string and is, for example, "000001", "000002", . . . , "999999".

In the example illustrated in FIG. 6, a label identification symbol is a 4-byte character string and is, for example, "HDR2". A record format is a 1-byte character string and is, for example, "F (fixed-length record)", "V (variable-length record), or "U (undefined-length record)". A block length is a 5-byte character string and is, for example, "32000". A record length is a 5-byte character string and is, for example, "32000". Each of a recording density and a file position is a 1-byte character string.

The tape format illustrated in FIGS. 3 to 6 is an example of standardized formats, and a detailed description is not given hereinafter. The illustrated example corresponds to a case in which one file is recorded on the tape.

A typical tape format has the volume name (see FIG. 4) and the file name (see FIG. 5). In the present embodiment, the volume name and the file name serve as data identification information of identifying/specifying data.

The disk array 24 is, for example, a RAID (redundant arrays of inexpensive disks) device in which multiple HDDs (hard disk drives) are managed in combination as a redundant storage. The disk array 24 provides a virtual storage for the layer controller 20.

Through distribution of server processing to multiple layers, the layer controller 20 is a server computer that is adapted to be able to flexibly deal with a case in which a change to one layer is needed.

In accordance with an instruction from the host 100, the layer controller 20 stores transmitted data onto the disk array 24 in the tape format. In accordance with an instruction from the host 100, the layer controller 20 transmits the data, stored in the disk array 24, to the host 100. In addition, in accordance with an instruction from the host 100, the layer controller 20 performs migration for moving the data, stored in the disk array 24, to the recording tape 33 in the tape library apparatus 3.

The layer controller 20 includes a memory 25 (a recording device) and so on, in addition to a CPU (central processing unit), a RAM (random access memory), a ROM (read only memory), and a HDD (hard disk drive), which are not illustrated. The CPU achieves various functions by executing an OS (operating system) and various programs stored in the HDD or the like. The memory 25 is, for example, a nonvolatile memory and stores a management table T described below.

The memory 25 in which the management table T is stored is not limited to a nonvolatile memory. The memory 25 may also be implemented by any other form, for example, a recording device, such as the RAM or HDD, for temporarily storing and loading data in order to execute the OS or the programs.

As illustrated in FIG. 1, the layer controller 20 has functions of a write processing unit 21, a patrol processing unit 22, and a migration processing unit 23.

The write processing unit 21 performs write processing for writing the data, received from the host 100, to the disk array 24 in the above-described tape format. As illustrated in FIG. 1, the write processing unit 21 includes a receiving unit 201, a checking unit 202, a compression-ratio calculating unit 203, a recording unit 204, a determining unit 205, a management-table creating unit 206, and a storage processing unit 207.

The receiving unit 201 receives, for each block, data to be written to the disk array 24. The received data is stored in a memory (a buffer), which is not illustrated. Data for each block may simply be referred to as a "block" hereinafter.

The checking unit 202 extracts the volume name and the file name from the header field (see FIG. 3) of the data that the receiving unit 201 received from the host 100. The checking unit 202 then compares the volume name and the file name received from the host 100 with a volume name and a file name in an entry registered in the management table T (data processing information) stored in the memory 25. Through the comparison, the checking unit 202 checks whether or not an entry corresponding to the received volume name and file name is registered in the management table T. That is, the checking unit 202 checks whether or not a data write processing request transmitted from the host 100 is for write processing to be performed on the same data for the second or subsequent time.

The compression-ratio calculating unit 203 calculates a compression ratio when a block is compressed using a data compression scheme. The term "compression ratio" as used herein refers to the ratio (percentage) of the size of compressed data to the size of uncompressed data and is also called a "compression residue ratio". The data compression scheme may be implemented by various known schemes, as needed. Examples include Huffman coding, Lempel-Ziv coding, and run-length coding.

The compression-ratio calculating unit 203 also has a function of a compression processing unit for actually compressing a block by using the aforementioned data compression scheme.

For example, after compressing a block by using the aforementioned compression scheme, the compression-ratio calculating unit 203 measures a data size of the compressed block and calculates a compression ratio by using the data size of the compressed block and the data size of the pre-compression block. Without actually compressing a block, the compression-ratio calculating unit 203 may obtain the data size of a compressed block by simulating the data size of the compressed block. Such a data size of a compressed block may be calculated using various known schemes, and a detailed description is not given hereinafter.

When a result of the checking performed by the checking unit 202 indicates that an entry corresponding to the received volume name and file name is not stored in the management table T, the compression-ratio calculating unit 203 calculates a compression ratio for each block included in the data.

When the block received from the host 100 is to be stored in the disk array 24, the determining unit 205 determines whether it is to be stored in a compressed state or in an uncompressed state. More specifically, the determining unit 205 compares the compression ratio of the block, the compression ratio being calculated by the compression-ratio calculating unit 203, with a certain threshold. When the calculated compression ratio is lower than the threshold, the determining unit 205 determines that the block is to be recorded to the disk array 24 in a compressed state. On the other hand, when the calculated compression ratio is higher than or equal to the threshold, the determining unit 205 determines that the block is to be recorded to the disk array 24 in an uncompressed state.

In this case, when the compression ratio exceeds a specific value, the processing time when uncompressed data is written is shorter than the processing time when compressed data is written. In the present embodiment, that specific value of the compression ratio is used as the threshold with which the determining unit 205 determines whether or not the block is to be compressed.

This threshold is a value that varies depending on a data-bus processing capability of the layer controller 20, the algorithm of the data compression, or the like. Accordingly, data are compressed with varied compression ratios and are written to the disk array 24 and the processing times for the respective compression ratios are measured, and on the other hand, the same data is written to the disk array 24 without compression and the processing time is measured. It is preferable to compare the processing time with each other and to use, as the above-described threshold, a compression ratio that is a boundary value at which the amount of time taken for processing for a case in which the data is compressed/decompressed and transferred is larger than the amount of time (the data transfer time) taken for the uncompressed data.

A description in the present embodiment is given of an example of a case in which the threshold with which the determining unit 205 determines whether the block is to be stored in the disk array 24 in a compressed state or an uncompressed state is 90%.

A result of the determination made by the determining unit 205 is reported to the compression-ratio calculating unit 203. When the result of the determination made by the determining unit 205 indicates "compressed", the compression-ratio calculating unit 203 compresses the received block and passes the compressed block to the recording unit 204. When the result of the determination made by the determining unit 205 indicates "uncompressed", the compression-ratio calculating unit 203 passes the received block to the recording unit 204 in an uncompressed state.

The management-table creating unit 206 serves as a data-processing-information creating unit for creating an entry to be registered in the management table T.

FIGS. 7A and 7B illustrate the management table T in the virtual tape library system 1 according to one example of the embodiment. More specifically, FIG. 7A illustrates one example of data and FIG. 7B illustrates an entry in the management table T with respect to the data illustrated in FIG. 7A.

In the example illustrated in FIG. 7A, the data field of data includes n blocks. In the example illustrated in FIG. 7A, each of the blocks included in the data field is shown together with a block number k (k is a natural number of 1 to n) in a bracket "( )". Block number 1 (k=1) is given to the first block of the series of blocks included in the data field and block number n (k=n) is given to the rearmost block of the series of blocks.

In the example illustrated in FIGS. 7A and 7B, the first and second blocks (k=1, 2) of the n blocks included in the data field are stored compressed and the third and subsequent blocks (k=3 to n) are stored uncompressed.

The management table T stores at least one entry serving as data processing information indicating a processing state of data stored in the disk array 24. In the example illustrated in FIG. 7B, in each entry in the management table T, a compressed/uncompressed state, a patrol pointer, and a last block are associated with a volume name and a file name for identifying and specifying corresponding data.

The volume name and the file name are data identification information for identifying the data. The compressed/uncompressed state is state information indicating in which of a compressed state and an uncompressed state each of the blocks included in the data field of the data is recorded. In the example illustrated in FIG. 7B, "0" indicates a compressed state and "1" indicates an uncompressed state.

The patrol pointer is information for specifying a block at which patrol processing (described below) is started. More specifically, with respect to data recorded in the disk array 24, the block number (first-block identification information) for identifying the first block included in continuous blocks in the data field of the data and recorded in the disk array 24 in an uncompressed state is registered as the patrol pointer.

That is, the management-table creating unit 206 serves as a first-block-identification-information recording unit that records, in the management table T, the patrol pointer in association with the first block included in the series of blocks in the data field of the data and recorded in the storage device in an uncompressed state.

The last block is information for specifying a block at which the patrol processing (described below) is ended. More specifically, the block number (k=n) for identifying the last block of the series of blocks included in the data field of data is registered as the last block.

That is, an entry (data processing information) in which a compressed/uncompressed state serving as the state information is associated with the volume name and the file name serving as the data identification information is stored in the management table T.

In the example illustrated in FIG. 7B, although only an entry for one piece of data having a volume name of "VOLAAA" and a file name of "HDRAAA" is shown in the management table T for convenience of illustration, the entry is not limited thereto and entries for other data may also be registered in the management table T.

The created management table T is stored in the memory 25.

Specifically, the storage processing unit 207 stores, in the memory 25, the management table T created by the management-table creating unit 206.

The recording unit 204 records the blocks to the disk array 24 in a compressed or uncompressed state. When the compression-ratio calculating unit 203 compresses the block, the recording unit 204 records the block to the disk array 24 in a compressed state, and when the compression-ratio calculating unit 203 does not compress the block, the recording unit 204 records the block to the disk array 24 in an uncompressed state.

That is, on the basis of the result of the determination made by the determining unit 205, the recording unit 204 records the block to the storage device in a compressed or uncompressed state.

When the result of the above-described checking performed by the checking unit 202 indicates that an entry corresponding to the received volume name and file name is registered in the management table T, the recording unit 204 records the received block to the storage device in a compressed or uncompressed state in accordance with the compressed/uncompressed state in the entry.

That is, when data already stored in the disk array 24 is to be re-stored in the disk array 24, the recording unit 204 refers to the compressed/uncompressed state associated with the data and recorded in the management table T.

In accordance with the compressed/uncompressed state in the entry associated with the data and recorded in the management table T, the recording unit 204 stores, in the disk array 24, each of the blocks in the data field of the data in a compressed or uncompressed state.

FIGS. 8A and 8B illustrate write processing using the management table T in the virtual tape library system 1 according to one example of the embodiment. More specifically, FIG. 8A illustrates an entry in the management table T and FIG. 8B illustrates one example of data for the management table T in FIG. 8A.

A description below will be given of an example of a case in which, when a write instruction is received from the host 100, corresponding data has a volume name of "VOLAAA" and a file name of "HDRAAA". In the example illustrated in FIG. 8A, the entry having the volume name of "VOLAAA" and the file name of "HDRAAA" is already registered in the management table T. In this case, the checking unit 202 confirms that an entry corresponding to the volume name and the file name of the received data is registered in the management table T in the memory 25.

The compression-ratio calculating unit 203 sets the blocks into compressed or uncompressed states in sequence from the first block in the data field of the received data, in accordance with the compressed and uncompressed states in the entry in the management table T. That is, in the example illustrated in FIG. 8A, the compressed and uncompressed sates in the entry indicate that the first block in the data field is in a compressed state and the second to fifth blocks are in uncompressed states. In accordance with the compressed and uncompressed states, the compression-ratio calculating unit 203 sets the first block in the data field into a compressed state and sets the second to fifth blocks into uncompressed states.

In this case, however, with respect to the block set into a compressed state according to the entry in the management table T, the determining unit 205 re-determines in which of a compressed state and an uncompressed state the block is to be written to the disk array 24, on the basis of a compression ratio for the block.

That is, with respect to the block compressed according to the entry in the management table T, the compression-ratio calculating unit 203 calculates a compression ratio for the block and passes the compression ratio to the determining unit 205. The determining unit 205 compares the compression ratio, calculated by the compression-ratio calculating unit 203, with a certain threshold. When the calculated compression ratio is higher than or equal to the threshold, the determining unit 205 determines that the block is to be recorded to the disk array 24 in an uncompressed state.

Thus, even for the block for which compressed uncompressed state has been set in the entry in the management table T, when the block whose compression ratio calculated by the compression-ratio calculating unit 203 is higher than or equal to the threshold, the block is re-written to the disk array 24 in an uncompressed state. As a result, even when the data stored in the disk array 24 is changed or modified for some reason, the compressed/uncompressed states in the entry in the management table T match the actual state of the data. Thus, it is possible to improve the reliability.

With respect to the block set into an uncompressed state in the compressed/uncompressed state in the entry in the management table T, the compression or un-compression re-determination based on the compression ratio is not performed. This arrangement achieves high-speed processing and can reduce the load of the layer controller 20.

The compression-ratio determining unit 203 passes the data of each block, set in a compressed/uncompressed state as described above, to the recording unit 204 and the recording unit 204 records the block, set in a compressed or uncompressed block, to the disk array 24.

Figure 9:
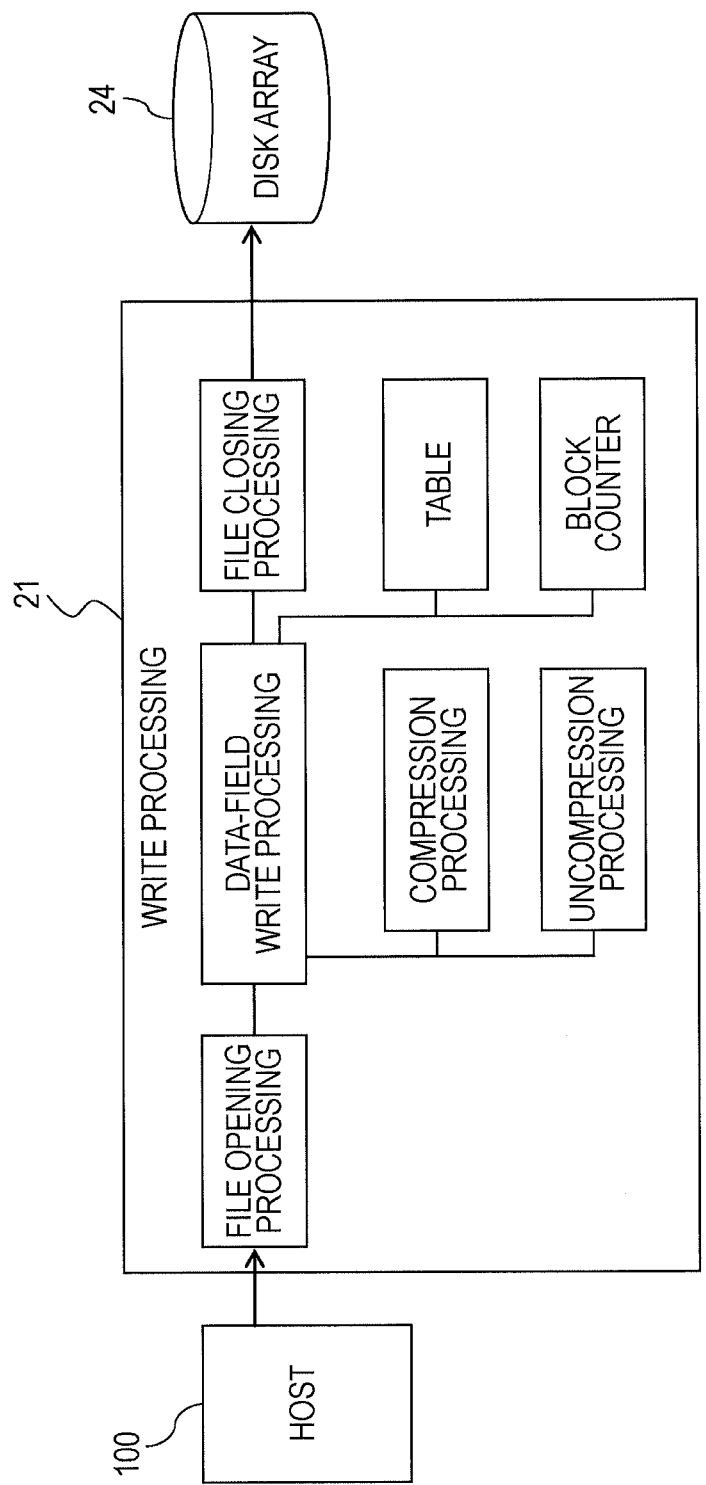
FIG. 9 is a block diagram schematically illustrating write processing for writing data to a disk array device in the virtual tape library system according to one example of the embodiment.

FIG. 9 is a block diagram schematically illustrating the write processing for writing data to the disk array 24 in the virtual tape library system 1 according to one example of the embodiment.

As illustrated in FIG. 9, the write processing includes file opening processing, data-field write processing, and file closing processing.

In the file opening processing, the file name of data to be written is obtained and the header field of the data is written to the disk array 24. In the data-field write processing, a compression ratio for each block in the data field of data to be written is calculated. On the basis of a result of the above-described calculation of the compression ratio, a compression/un-compression determination for each block is made. In addition, on the basis of a result of the determination, compression processing for storing the block in the disk array 24 in a compressed state or un-compression processing for storing the block in the disk array 24 in an uncompressed state is performed. The data-field write processing is performed while reference is being made to the management table T and a block counter.

The block counter is information (a counter value) for specifying a block to be processed in the write processing and the migration processing (described below) and corresponds to the block number of the corresponding block included in the data. In the file closing processing, an EOF (end of file) field of the data is written to the disk array 24.

The patrol processing unit 22 performs patrol processing for updating the management table T created by the management-table creating unit 206. The patrol processing is started, for example, upon reception of an unload command from the host 100. It is desired that the patrol processing be performed when a predetermined amount of time passes after the last patrol processing was performed.

As illustrated in FIG. 1, the patrol processing unit 22 includes a recalculating unit 221 and an updating unit 222.

The recalculating unit 221 recalculates the compression ratio for each block of the data recorded in the disk array 24. The recalculating unit 221 calculates the compression ratio for the block by using a scheme that is similar to the scheme for the compression-ratio calculating unit 203.

During the patrol processing, the recalculating unit 221 sequentially calculates (recalculates) the compression ratio for each of the subsequent blocks included in the data field, starting at the block specified by the patrol pointer in the management table T.

On the basis of the compression ratio recalculated by the recalculating unit 221, the updating unit 222 updates, in the management table T, the compressed/uncompressed state of each block. That is, on the basis of the compression ratio recalculated by the recalculating unit 221, the updating unit 222 determines in which of a compressed state or an uncompressed state the block is to be stored.

More specifically, the updating unit 222 compares the compression ratio of the block, the compression ratio being recalculated by the recalculating unit 221, with a certain threshold. When the recalculated compression ratio is lower than the threshold, it is determined that the block is to be compressed. When the recalculated compression ratio is higher than or equal to the threshold, it is determined that the block is not to be compressed.

When a result of the determination indicates that the compressed/uncompressed state of the block is different from the state in the management table T, the updating unit 222 updates, in the management table T, the compressed/uncompressed state of the block with the determination result based on the recalculated compression ratio. In this case, the block stored in the disk array 24 is not rewritten in a compressed or uncompressed state and the management table T is merely updated.

Figure 10A:
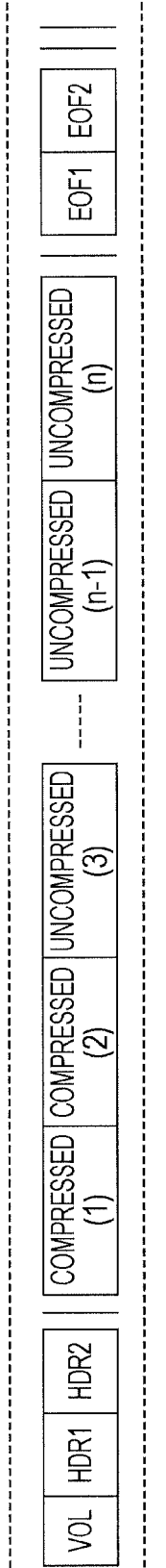
FIGS. 10A and 10B illustrate patrol processing in the virtual tape library system according to one example of the embodiment.
Figure 10B:
Figures 11A, 11B:
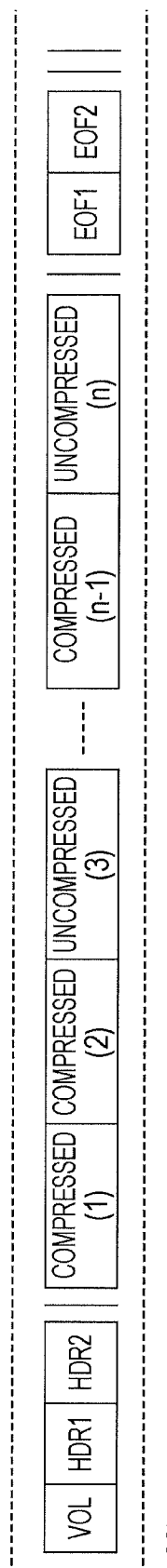
FIGS. 11A and 11B illustrate the patrol processing in the virtual tape library system according to one example of the embodiment.

FIGS. 10A, 10B, 11A, and 11B illustrate patrol processing in the virtual tape library system 1 according to one example of the embodiment. More specifically, FIG. 10A illustrates one example of data before the patrol processing is performed and FIG. 10B illustrates an entry in the management table T with respect to the data illustrated in FIG. 10A. FIG. 11A illustrates one example of data after the patrol processing is performed and FIG. 11B illustrates an entry in the management table T with respect to the data illustrated in FIG. 11A.

In the examples illustrated in FIGS. 10A, 10B, 11A, and 11B, the data field of the data includes n blocks. In the example illustrated in FIGS. 10A and 10B, each of the blocks included in the data field is shown together with a block number k (k is a natural number of 1 to n) in a bracket "( )". Block number 1 (k=1) is given to the first block of the series of blocks included in the data field and block number n (k=n) is given to the rearmost block of the series of blocks.

Before the patrol processing is performed, the first and second blocks (k=1, 2) of the n blocks in the data field are stored compressed and the third and subsequent blocks (k=3 to n) are stored uncompressed, as illustrated in FIGS. 10A and 10B.

In the patrol processing performed by the patrol processing unit 22, for example, when it is determined that the compression ratio of the (n−1) block is smaller than the threshold, as illustrated in FIG. 11A, a "compressed" state is set in the compressed/uncompressed state in the entry of the corresponding data in the management table T with respect to the (n−1) block, as illustrated in FIG. 11B.

Figure 12:
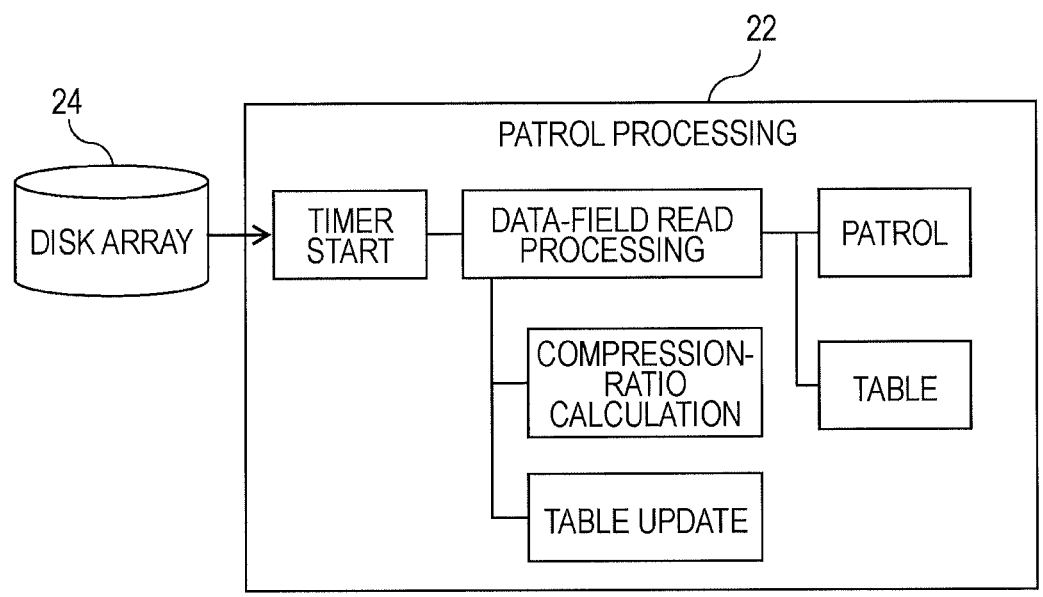
FIG. 12 is a block diagram schematically illustrating the patrol processing in the virtual tape library system according to one example of the embodiment.

FIG. 12 is a block diagram schematically illustrating the patrol processing in the virtual tape library system 1 according to one example of the embodiment.

As illustrated in FIG. 12, the patrol processing includes timer start and data-field read processing.

In the timer start, the timer is started upon reception of an unload command from the host 100, and when a predetermined time passes after the last patrol processing was performed, the patrol processing is started.

The data-field read processing is performed while reference is being made to the patrol pointer and the management table T. In the data-field read processing, the patrol pointer is obtained by referring to the entry of the corresponding data in the management table T. The compression ratio of each of the subsequent blocks included in the data field is calculated (recalculated), starting at the block specified by the patrol pointer. On the basis of the recalculated compression ratio, the compressed/uncompressed state for each corresponding block is updated in the management table T.

The migration processing unit 23 performs migration processing for moving the data stored in the storage device to the recording tape (recording medium) 33. The migration processing is started when the volume name and the file name (the data identification information) for identifying the data to be migrated are received from the host 100 in conjunction with a migration execution instruction.

As illustrated in FIG. 1 the migration processing unit 23 includes a data-save processing unit 231 and a management-table referring unit 232.

On the basis of the volume name and the file name received along with the migration execution instruction, the management-table referring unit 232 (which serves as a data-processing-information referring unit) refers to the management table T to check whether or not an entry for the data to be migrated is registered. That is, the management-table referring unit 232 checks whether or not the volume name and the file name of the data to be migrated are registered in the management table T.

The data-save processing unit 231 (which serves a medium recording unit) controls the tape library apparatus 3 to store the data, stored in the disk array 24, onto the recording tape 33. When a result of the reference performed by the management-table referring unit 232 indicates that an entry for the data to be migrated is registered in the management table T, the data-save processing unit 231 obtains the compressed/uncompressed state in the entry. In accordance with the compressed/uncompressed state, the data-save processing unit 231 records the data to be migrated, the data being stored in the disk array 24, to the recording tape 33 in a compressed or uncompressed state.

Figure 13:
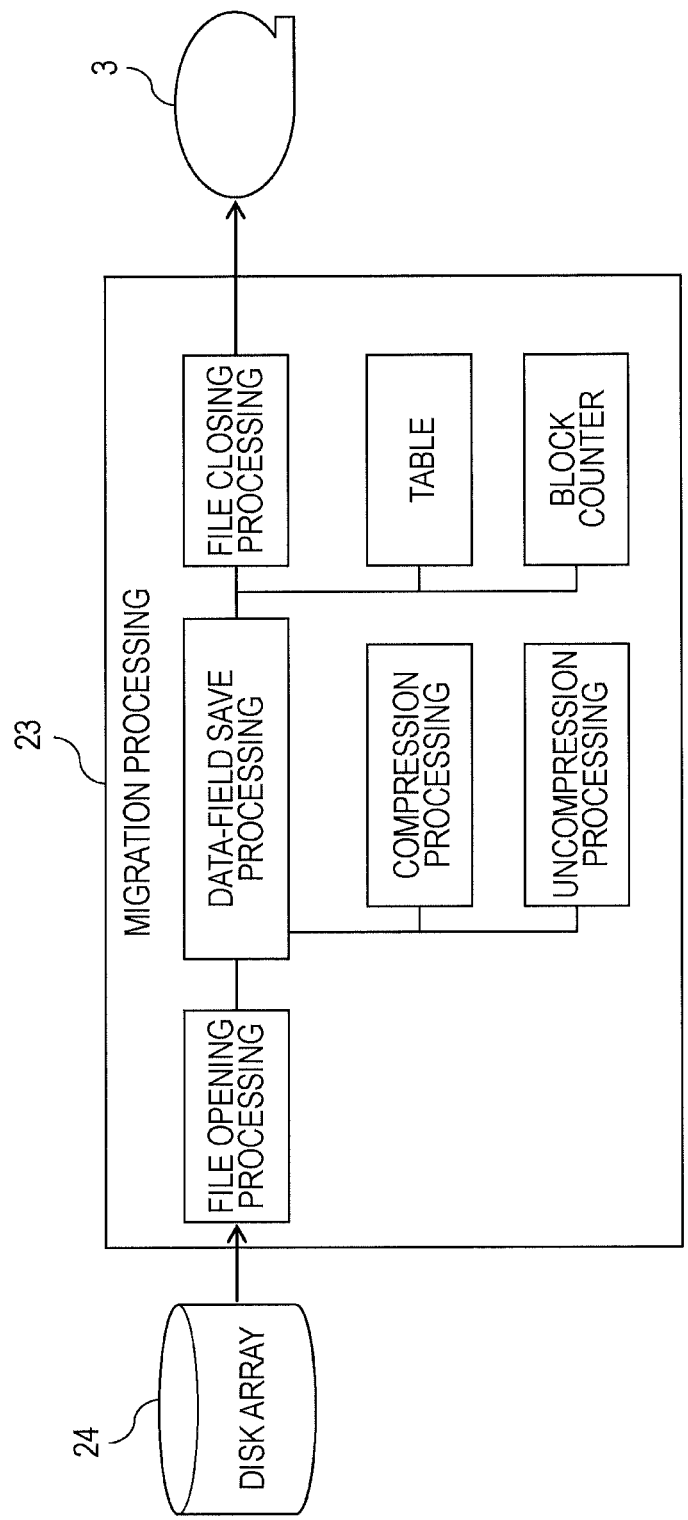
FIG. 13 is a block diagram schematically illustrating migration processing in the virtual tape library system according to one example of the embodiment.

FIG. 13 is a block diagram schematically illustrating the migration processing in the virtual tape library system 1 according to one example of the embodiment.

As illustrated in FIG. 13, the migration processing includes file opening processing, data-field save processing, and file closing processing.

In the file opening processing, data to be migrated is obtained from the disk array 24. The file name of the data is then obtained and the header field of the data is written to the recording tape 33.

In the data-field save processing, the entry for the corresponding data is referred to in the management table T, and in accordance with the compressed/uncompressed state in the entry, each of the blocks included in the data field of the data to be migrated is processed. That is, with respect to each block, compression processing for storing the block on the recording tape 33 in a compressed state or un-compression processing for storing the block on the recording tape 33 in an uncompressed state is performed in accordance with the compressed/uncompressed state in the management table T. The data-field save processing is performed while reference is being made to the management table T and a block counter. In the file closing processing, the EOF field of the data is written to the recording tape 33.

Figure 14:
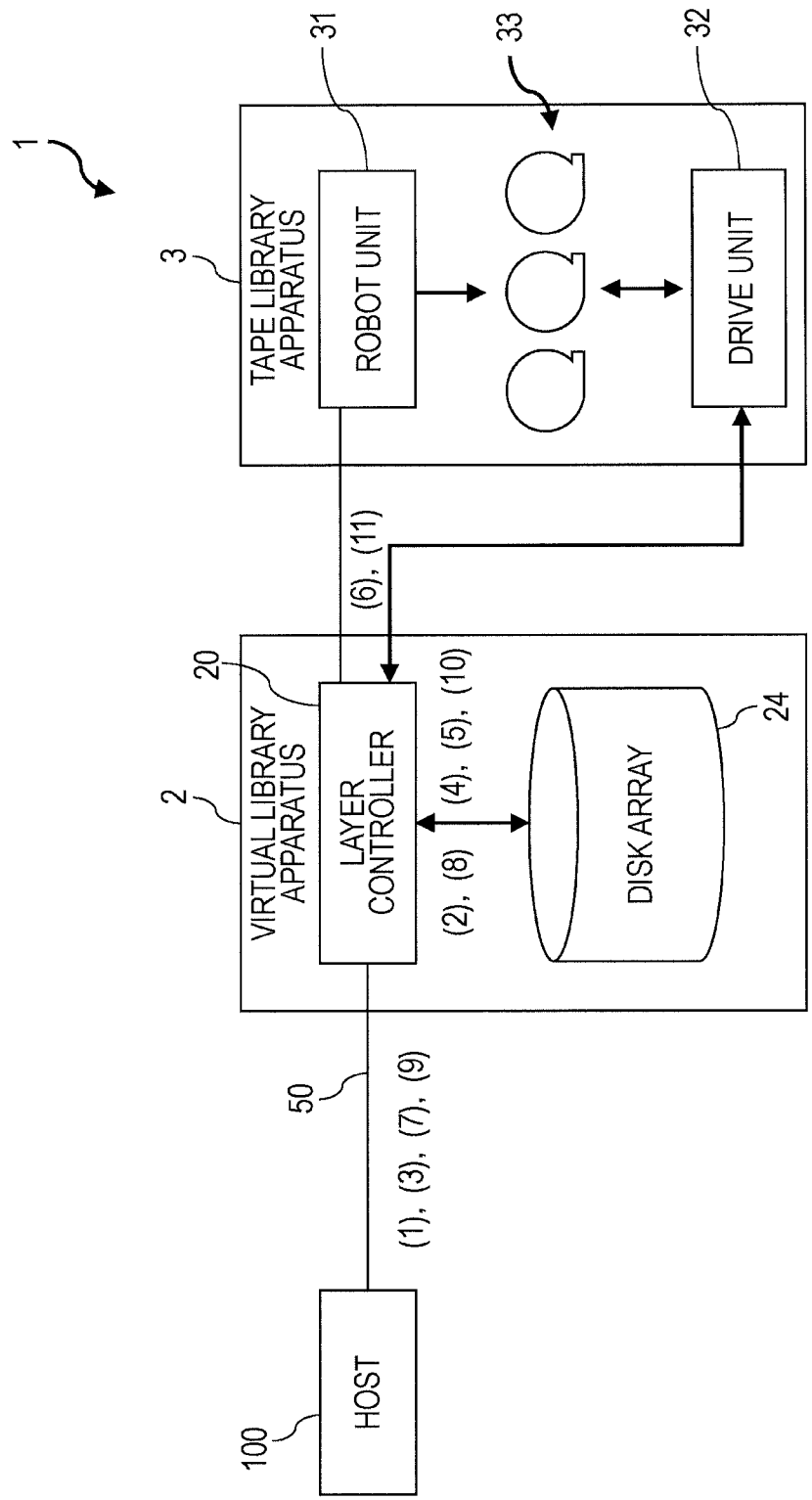
FIG. 14 is a block diagram illustrating an overview of processing for compressed/uncompressed control for a general job transmitted from a host, the processing being performed by the virtual tape library system according to one example of the embodiment.

An overview of processing for compression/un-compression control for a general job transmitted from the host 100, the processing being performed by the virtual tape library system 1 according to one example of the embodiment, will be described below with reference to FIG. 14. In the following description, numerals in brackets "( )" represent an order of processing and correspond to the numerals in brackets "( )" in FIG. 14.

(1) The host 100 transmits uncompressed data to the layer controller 20.

(2) The write processing unit 21 in the layer controller 20 processes sequentially the blocks from the first block in the data field and writes the blocks to the disk array 24 in a compressed or uncompressed state. More specifically, when the compression ratio of the block is lower than the threshold (e.g., 90%), the write processing unit 21 writes the block to the disk array 24 in a compressed state, and when the compression ratio of the block is higher than or equal to the threshold, the write processing unit 21 writes the block to the disk array 24 in an uncompressed state. The volume name, the file name, the compressed/uncompressed state, and the patrol pointer of the data are stored in the memory 25 in the layer controller 20. In this case, the block whose compression ratio has become higher than the threshold to the last block of the file are processed without compression. The block number of the block next to the block whose compression residue ratio becomes higher than the threshold is stored in the management table T in the memory 25 in the layer controller 20 as the patrol pointer.

(3) At the end of a job, the host 100 transmits an unload command to the layer controller 20.

(4) In response to the unload command, the patrol processing unit 22 starts the patrol processing on the data in the disk array 24. More specifically, the patrol processing unit 22 measures the compression ratio for the block specified by the patrol pointer. When the measured compression ratio is lower than the threshold, the patrol processing unit 22 marks "compressed" in the management table T in the layer controller 20 so that the block is to be compressed. Similarly, when the compression ratio is higher than or equal to the threshold, the patrol processing unit 22 marks "uncompressed" in the management table T in the layer controller 20 so that the block is not to be compressed.

(5) The patrol processing unit 22 performs the patrol processing on the data in the disk array 24 at regular intervals and repeatedly measures the compression ratio for the block specified by the patrol pointer. That is, when the compression ratio is lower than the threshold, the patrol processing unit 22 marks "compressed" in the compressed/uncompressed state in the management table T in the layer controller 20 so that the block is to be processed, thereby updating the management table T. Similarly, when the compression ratio is higher than or equal to the threshold, the patrol processing unit 22 marks "uncompressed" in the compressed/uncompressed state in the management table T in the layer controller 20 so that the block is not to be compressed.

(6) After the patrol processing is completed, the migration processing unit 23 performs compression/un-compression control on each block in the data field in accordance with the compressed/uncompressed state in the management table T stored in the memory 25 in the layer controller 20 and stores (migrates) the data to the recording tape 33 via the drive unit 32. More specifically, the migration processing unit 23 stores, in a compressed state, the block that is registered as "compressed" in the compressed/uncompressed state in the management table T and stores, in an uncompressed state, the block that is registered as "uncompressed" in the compressed/uncompressed state. In this case, for example, with respect to a block whose compressed/uncompressed state stored in the disk array 24 is different from the corresponding compressed/uncompressed state in the management table T, processing for compressing the uncompressed data or decompressing the compressed data is performed in accordance with the management table T. Thus, for example, when a block stored compressed in the disk array 24 is marked as "uncompressed" in the management table T, processing for extracting the data is performed to generate uncompressed data.

(7) In write processing performed on the same data for the second or subsequent time, the host 100 transmits uncompressed data to the layer controller 20.

(8) In the write processing performed on the same data for the second or subsequent time, when the volume name and the file name of the received data match those stored in the management table T, the write processing unit 21 sequentially writes each block to the disk array 24 in accordance with the form of the compressed/uncompressed state in the management table T. When it is found that the number of data blocks in the file has increased, the write processing unit 21 writes the blocks up to the last block to the disk array 24 in an uncompressed state. The patrol pointer is then returned to the first one of the uncompressed blocks.

(9) In the write processing performed on the same data for the second or subsequent time, the host 100 transmits an unload command to the layer controller 20 at the end of the job.

(10) In patrol processing performed on the same data for the second or subsequent time, the patrol processing unit 22 starts patrol of the data in the disk array 24 in response to the unload command. More specifically, the patrol processing unit 22 measures the compression ratio for the block specified by the patrol pointer. When the compression ratio is lower than the threshold, the layer controller 20 marks "compressed" in the management table T. When the compression ratio is higher than or equal to the threshold, the layer controller 20 marks "uncompressed" in the management table T.

(11) In migration processing performed on the same data for the second or subsequent time, after the patrol processing is completed, the migration processing unit 23 stores the data on the recording tape 33 in accordance with the compressed/uncompressed state in the management table T stored in the memory 25 in the layer controller 20. That is, the migration processing unit 23 stores, on the recording tape 33 in a compressed state, the block that is registered as "compressed" in the compressed/uncompressed state in the management table T and stores, on the recording tape 33 in an uncompressed state, the block that is registered as "uncompressed". In this case, for example, with respect to a block whose compressed/uncompressed state stored in the disk array 24 is different from the corresponding compressed/uncompressed state in the management table T, processing for compressing the uncompressed data or decompressing (extracting) the compressed data is performed in accordance with the compressed/uncompressed state in the management table T.

Figure 15:
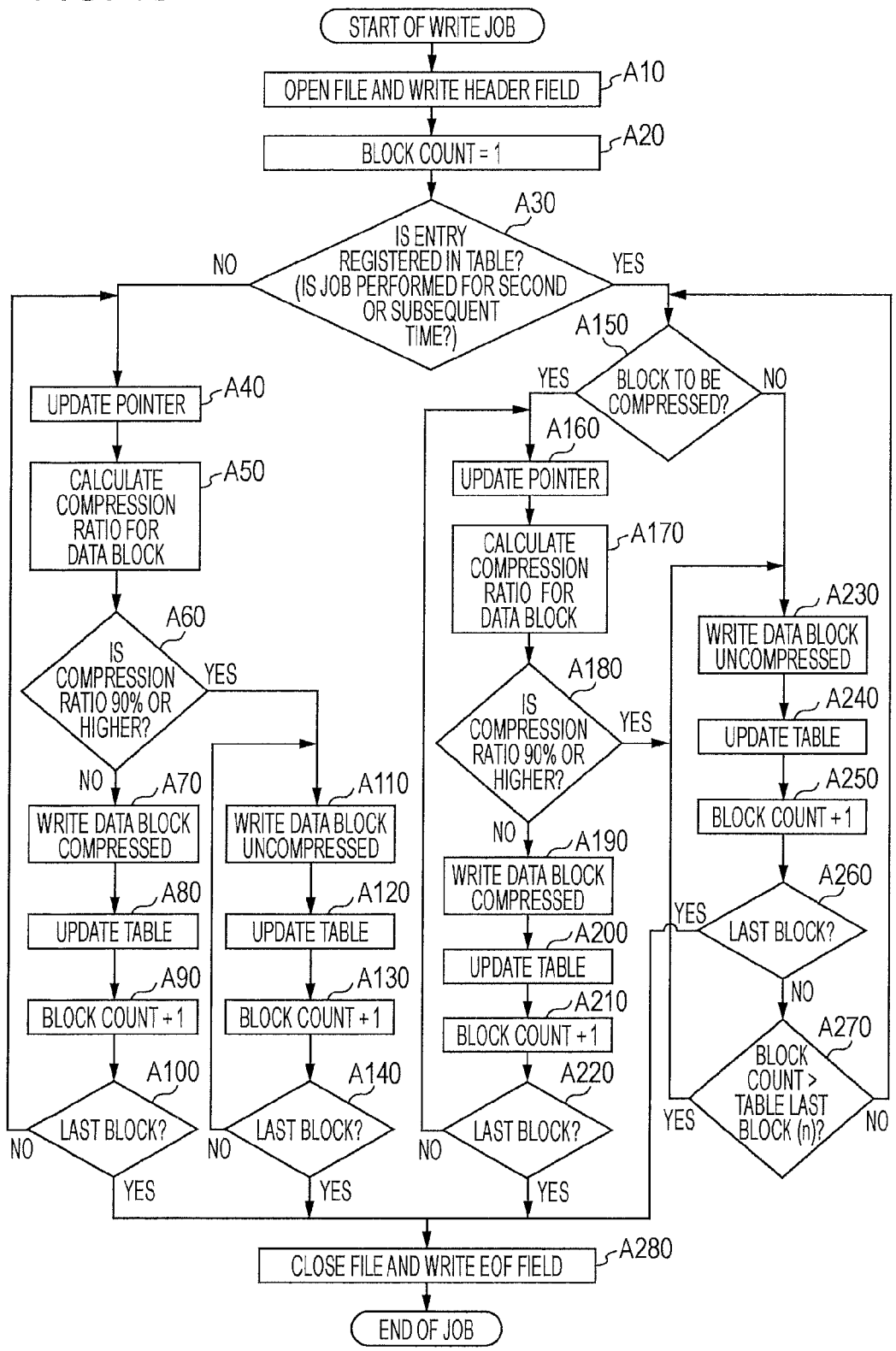
FIG. 15 is a flowchart illustrating the write processing in the virtual tape library system according to one example of the embodiment.

The write processing in the virtual tape library system 1, configured as described above, according to one example of the embodiment will now be described with reference to a flowchart (steps A10 to A280) illustrated in FIG. 15.

When the host 100 transmits uncompressed data to the layer controller 20, the receiving unit 201 receives the data and performs file opening processing in step A10. In the file opening processing, the header field of the data is written to the disk array 24.

In step A20, the write processing unit 21 sets the block counter to 1 (i.e., Block Count=1) to thereby reset the block counter. This block counter corresponds to the block number of a block included in the data field.

In step A30, the determining unit 205 checks whether or not an entry corresponding to the volume name and the file name of the data that the receiving unit 201 received along with a write instruction from the host 100 is registered in the management table T stored in the memory 25. That is, in step A30, the determining unit 205 checks whether or not the data-write processing request transmitted from the host 100 is for write processing to be performed on the same data for the second or subsequent time.

When an entry corresponding to the volume name and the file name of the received data is not registered in the management table T, i.e., when the data-write processing request transmitted from the host 100 is for write processing to be performed for the first time (NO route from step A30), a new entry is created in the management table T and the volume name and the file name of the received data are registered therein.

In step A40, the patrol pointer in the entry is updated first. More specifically, the value of the block counter is set for the patrol pointer to thereby update the patrol pointer.

Next, in step A50, the compression-ratio calculating unit 203 calculates a compression ratio for, in the data field, the block specified by the block counter. In step A60, the determining unit 205 compares the calculated compression ratio with a certain threshold (90%) to thereby determine in which of a compressed state or an uncompressed state the block is to be stored in the disk array 24.

When the compression ratio is lower than the threshold (NO route from step A60), the process proceeds to step A70 in which the recording unit 204 writes the block to the disk array 24 in a compressed state. In step A80, with respect the compressed/uncompressed state in the entry associated with the data and registered in the management table T, the management-table creating unit 206 sets "0" indicating "compressed" in association with the block, thereby updating the management table T.

Thereafter, in step A90, the block counter is incremented (i.e., Block Count+1). In step A100, it is checked whether or not the block is the last block of the series of blocks included in the data field. That is, it is checked whether or not the block counter matches the block number n of the rearmost block of the series of blocks.

When the block is not the last block of the series of blocks included in the data field (NO route from step A100), the process returns to step A40. When the block is the last block of the series of blocks included in the data field (YES route from A100), the process proceeds to step A280 in which file closing processing is performed and the EOF field of the data is written to the disk array 24. Thereafter, the processing ends.

When the compression ratio is higher than or equal to the threshold (YES route from A60), the process proceeds to step A110 in which the recording unit 204 writes the block to the disk array 24 in an uncompressed state. In step A120, with respect to the compressed/uncompressed state in the entry associated with the data and registered in the management table T, the management-table creating unit 206 sets "1" indicating "uncompressed" in association with the block, thereby updating the management table T.

Thereafter, in step A130, the block counter is incremented (i.e., Block Count+1). In step A140, it is checked whether or not the block is the last block of the series of blocks included in the data field. That is, it is checked whether or not the block counter matches the block number n of the rearmost block of the series of blocks.

When the block is not the last block of the series of blocks included in the data field (NO route from step A140), the process returns to step A110. That is, the block whose compression ratio has become higher than the threshold to the last block of the file are processed without compression. When the block is the last block of the series of blocks included in the data field (YES route from A140), the process proceeds to step A280 and then the processing ends.

When an entry corresponding to the volume name and the file name of the received data is registered in the management table T, i.e., when the data write processing request transmitted from the host 100 is for write processing performed for the second or subsequent time (YES route from A30), the entry corresponding to the volume name and the file name of the received data is referred to in the management table T.

Next, in step A150, the management table T is referred to check whether or not the block corresponding to the block counter is a block to be compressed. When the block is not a block to be compressed (NO route from step A150), the process proceeds to step A230 in which the block is written to the disk array 24 in an uncompressed state. In step A240, with respect to the compressed/uncompressed state in the entry associated with the data and registered in the management table T, the management-table creating unit 206 sets "1" indicating "uncompressed" in association with the block, thereby updating the management table T. With this arrangement, for example, when a block that has been processed as compressed data in the previous processing is determined in processing in step A180 (described below) to have a compression ratio that is higher than or equal to the threshold and is determined to be "uncompressed", this change to the "uncompressed" state can be correctly reflected in the management table T.

After step A240, in step A250, the block counter is incremented (i.e., Block Count+1). In step A260, it is checked whether or not the block is the last block of the series of blocks included in the data field. That is, it is checked whether or not the block counter matches the block number n of the rearmost block of the series of blocks.

When the block is not the last block of the series of blocks included in the data field (NO route from step A260), the process proceeds to step A270 in which it is checked whether or not the number of blocks in the data field of the data has increased from the number of blocks registered in the management table T. That is, it is checked whether or not the value (the block count) of the block counter is larger than the block number (the table last block) n of the rearmost block.

When the number of blocks has increased, i.e., when the value (the block count) of the block counter is larger than the block number (the table last block) n of the rearmost block (YES route from A270), the process returns to step A230. That is, when it is found that the number of blocks has increased, the subsequent block to the last block of the file are processed without compression. When the number of blocks has not increased, i.e., when the value (the block count) of the block counter is smaller than or equal to the block number (the table last block) n of the rearmost block (NO route from step A270), the process returns to step A150.

When the block is the last block of the series of blocks included in the data field (YES route from A260), the process proceeds to step A280 and then the processing ends.

When a result of the checking of the entry in the management table T indicates that the block is a block to be compressed (YES route from A150), the process proceeds to step A160 in which the patrol pointer in the entry is first updated. More specifically, the value of the block counter is set for the patrol pointer to thereby update the patrol pointer. As a result, when the block is a block to be compressed, the value of the block counter specifying the block is set for the patrol pointer. That is, the patrol pointer indicates a position at which the state of the block is changed from a compressed state to an uncompressed state (i.e., the first position of an uncompressed block).

Next, in step A170, the compression-ratio calculating unit 203 calculates a compression ratio for, in the data field, the block specified by the block counter. In step A180, the determining unit 205 compares the calculated compression ratio with the certain threshold (90%) to thereby determine in which of a compressed state or an uncompressed state the block is to be stored in the disk array 24.

When the compression ratio is higher than or equal to the threshold (YES route from A180), the process proceeds to step A230.

On the other hand, when the compression ratio is lower than the threshold (NO route from step A180), the process proceeds to step A190 in which the recording unit 204 writes the block to the disk array 24 in a compressed state. In step A200, with respect to the compressed/uncompressed state in the entry associated with the data and registered in the management table T, the management-table creating unit 206 sets "0" indicating "compressed" in association with the block, thereby updating the management table T.

Thereafter, in step A210, the block counter is incremented (i.e., Block Count+1). In step A220, it is checked whether or not the block is the last block of the series of blocks included in the data field. That is, it is checked whether or not the block counter matches the block number n of the rearmost of the series of blocks.

When the block is not the last block of the series of blocks included in the data field (NO route from step A220), the process returns to step A160. When the block is the last block of the series of blocks included in the data field (YES route from A220), the process proceeds to step A280 in which file closing processing is performed and the EOF field of the data is written to the disk array 24. Thereafter, the processing ends.

Figure 16:
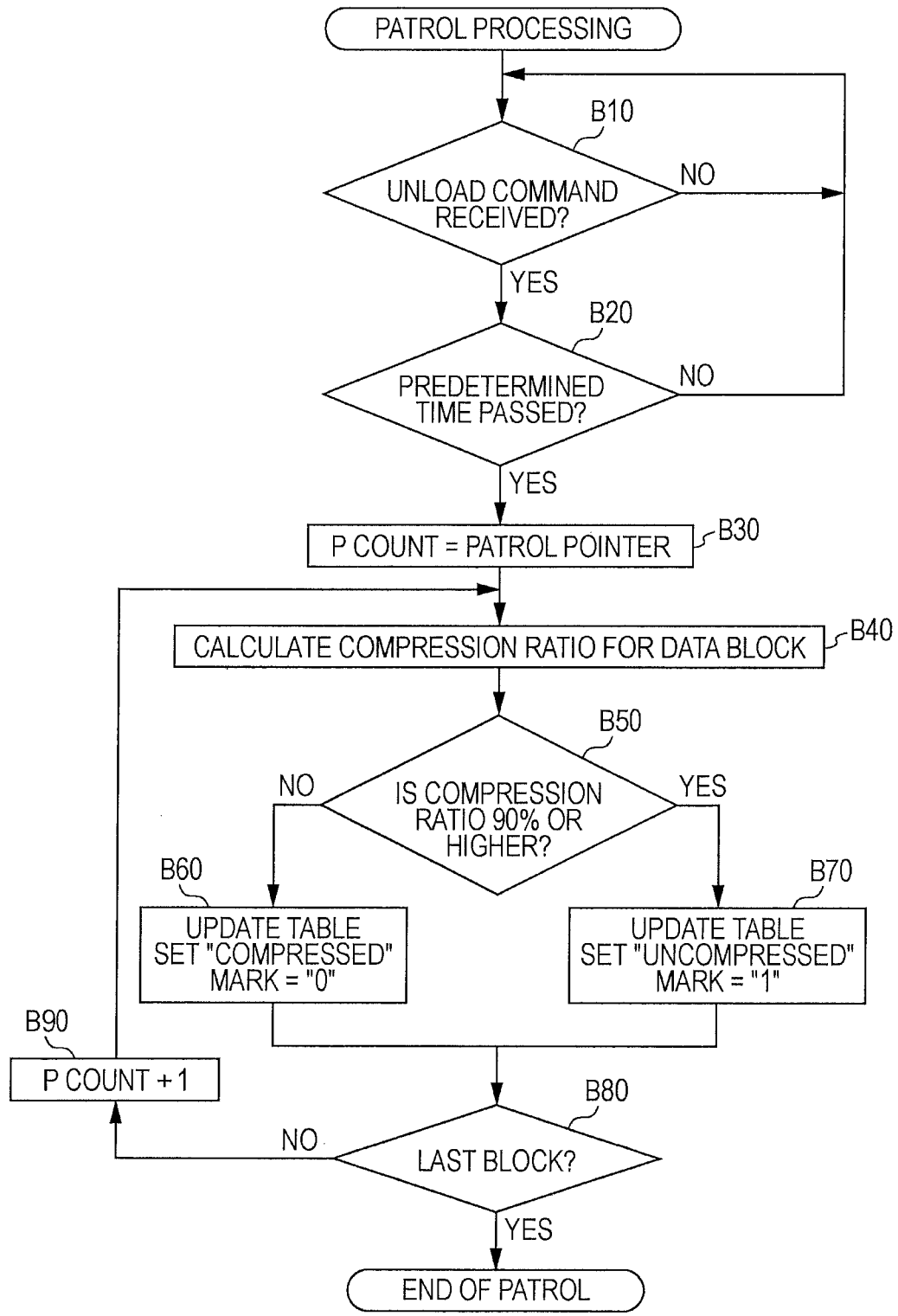
FIG. 16 is a flowchart illustrating the patrol processing in the virtual tape library system according to one example of the embodiment.

Next, the patrol processing in the virtual tape library system 1 according to one example of the embodiment will be described with reference to a flowchart (steps B10 to B90) illustrated in FIG. 16. The patrol processing is performed while the management table T is stored in the memory 25.

The patrol processing is started upon reception of an unload command transmitted from the host 100 at the end of a job. The patrol processing unit 22 waits to receive the unload command from the host 100 (refer to step B10 and NO route from step B10). Upon reception of the unload command from the host 100 (YES route from B10), the process proceeds to step B20 in which the patrol processing unit 22 checks whether or not a predetermined time has passed after the last patrol processing was performed. When the predetermined time has not passed (NO route from step B20), the process returns to step B10.

When the predetermined time has passed after the last patrol processing was performed (YES route from B20), the process proceeds to step B30 in which the patrol pointer registered in the entry in the management table T is set for the patrol counter (P Count). The patrol counter is information (a counter value) for specifying a block to be processed in the patrol processing and corresponds to the block number of the block included in data.

In step B40, the recalculating unit 221 calculates a compression value for, in the data field, the block specified by the patrol counter. In step B50, the recalculating unit 221 checks whether or not the calculated compression ratio is higher than or equal to the certain threshold (e.g., 90%). When a result of the checking indicates that the calculated compression ratio is higher than or equal to the threshold (90%) (YES route from B50), the process proceeds to step B70. In step B70, with respect to the compressed/uncompressed state in the entry associated with the data and registered in the management table T, the updating unit 222 sets "1" indicating "uncompressed" in association with the block. Thus, the management table T is updated. When the calculated compression ratio is lower than the threshold (90%) (NO route from step B50), the process proceeds to step B60. In step B60, with respect to the compressed/uncompressed state in the entry associated with the data and registered in the management table T, the updating unit 222 sets "0" indicating "compressed" in association with the block. Thus, the management table T is updated.

Thereafter, in step B80, it is checked whether or not the block specified by the patrol counter is the last block of the series of blocks included in the data field. That is, it is checked whether or not the patrol counter matches the block number n of the rearmost block of the series of blocks (i.e., P Count=n).

When the block is not the last block of the series of blocks included in the data field (NO route from step B80), the process proceeds to step B90 in which the patrol counter is incremented (i.e., P Count+1). Thereafter, the process returns to step B40. When the block is the last block of the series of blocks included in the data field (YES route from B80), the patrol processing ends.

Figure 17:
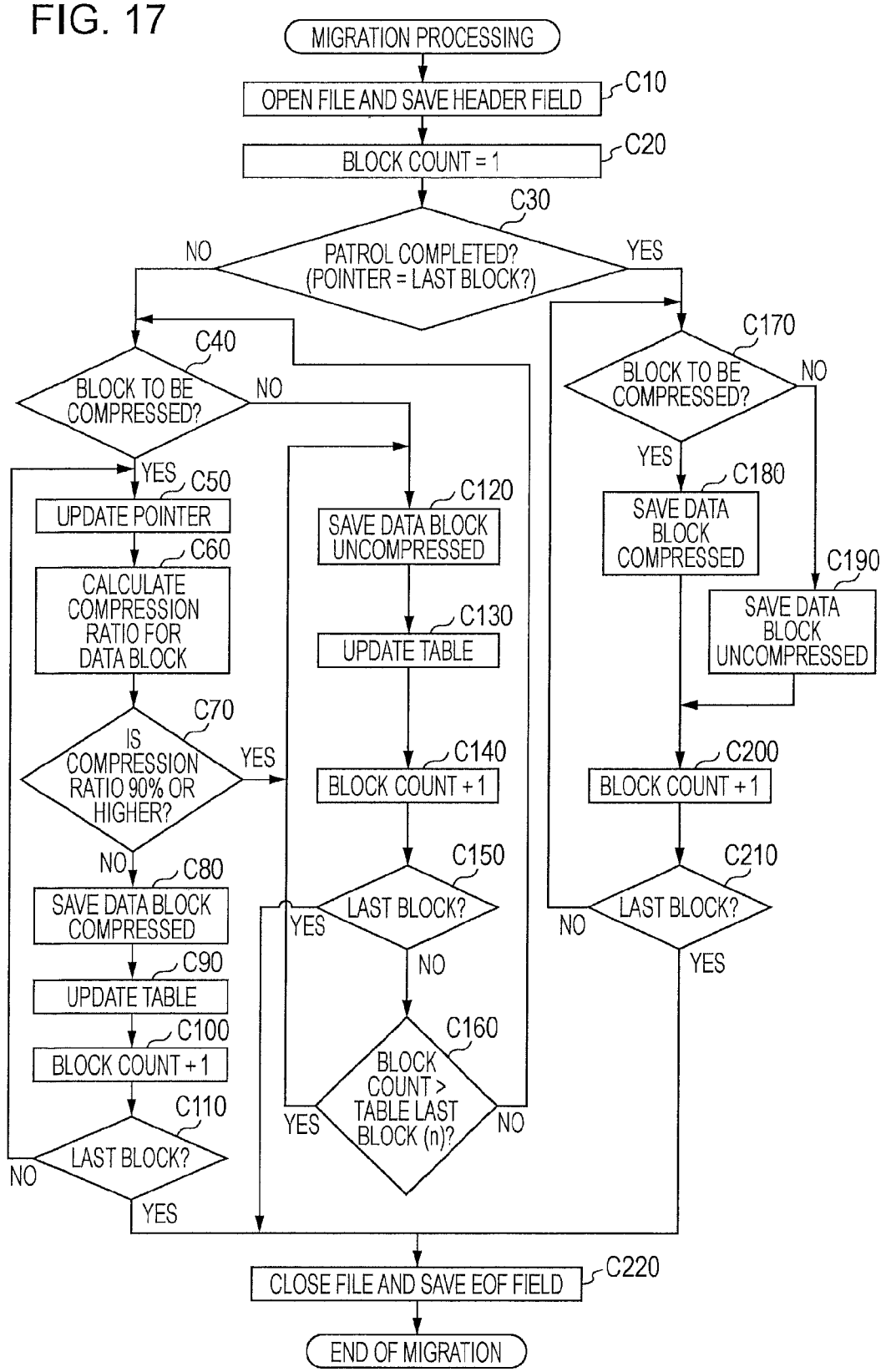
FIG. 17 is a flowchart illustrating the migration processing in the virtual tape library system according to one example of the embodiment.
Figure 18:
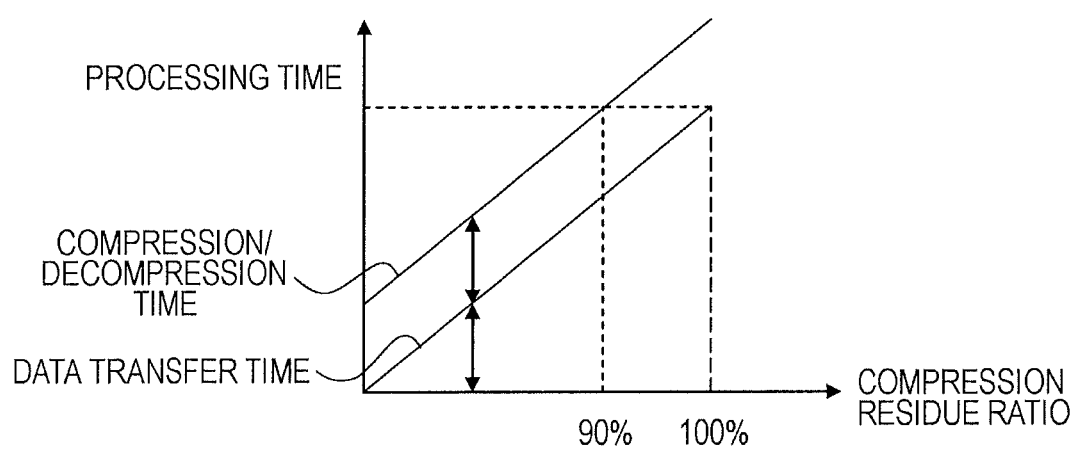
FIG. 18 illustrates a compression residue ratio versus processing time.

The migration processing in the virtual tape library system 1 according to one example of the embodiment will now be described with reference to a flowchart (steps C10 to C220) illustrated in FIG. 17.

When the volume name and the file name for identifying data to be migrated are received from the host 100 in conjunction with a migration execution instruction, the migration processing unit 23 performs file opening processing in step C10. In the file opening processing, the data-save processing unit 231 saves the header field of the data to the recording tape 33.

In step C20, the migration processing unit 23 sets the block counter to 1 (i.e., Block Count=1) to thereby reset the block counter. This block counter corresponds to the block number of a block included in the data.

In step C30, the migration processing unit 23 checks whether or not the patrol processing performed by the patrol processing unit 22 is completed. More specifically, it is checked whether or not the patrol counter matches the block number n of the rearmost block of the series of blocks (i.e., P Count=n).

When a result of the checking indicates that the patrol processing is completed (YES route from C30), the process proceeds to step C170 in which the management table T is referred to check whether or not the block corresponding to the block counter is a block to be compressed. When the block is not a block to be compressed (NO route from step C170), the process proceeds to step C190 in which the data-save processing unit 231 writes the block to the recording tape 33 in an uncompressed state. When the block is a block to be compressed (YES route from C170), the process proceeds to step C180 in which the data-save processing unit 231 writes the block to the recording tape 33 in a compressed state.

Thereafter, in step C200, the block counter is incremented (i.e., Block Count+1). In step C210, it is checked whether or not the block is the last block of the series of blocks included in the data field. That is, a determination is made as to whether or not the block counter matches the block number n of the rearmost block of the series of blocks.

When the block is not the last block of the series of blocks included in the data field (NO route from step C210), the process returns to step C170. When the block is the last block of the series of blocks included in the data field (YES route from C210), the process proceeds to step C220 in which file closing processing is performed and the EOF field of the data is written to the disk array 24. Thereafter, the processing ends.

When the patrol processing is not completed (NO route from step C30), the patrol processing is completed while the migration processing is executed.

In step C40, the management table T is referred to check whether or not the block corresponding to the block counter is a block to be compressed. When the block is not a block to be compressed (NO route from step C40), the process proceeds to step C120 in which the data-save processing unit 231 writes the block to the recording tape 33 in an uncompressed state. In step C130, with respect to the compressed/uncompressed state in the entry associated with the data and registered in the management table T, the migration processing unit 23 sets "1" indicating "uncompressed" in association with the block, thereby updating the management table T.

Thereafter, in step C140, the migration processing unit 23 increments the block-counter by 1 (i.e., Block Count+1). In step C150, it is checked whether or not the block is the last block of the series of blocks included in the data field. That is, it is checked whether or not the block counter matches the block number n of the rearmost block of the series of blocks.

When the block is not the last block of the series of blocks included in the data field (NO route from step C150), the process proceeds to step C160 in which the migration processing unit 23 checks whether or not the number of blocks in the data field of the data has increased from the number of blocks registered in the management table T. That is, the migration processing unit 23 checks whether or not the value (the block count) of the block counter is larger than the block number (the table last block) n of the rearmost block.

When the number of blocks has increased, i.e., when the value (the block count) of the block counter is larger than the block number (the table last block) n of the rearmost block (YES route from C160), the process returns to step C120. That is, when it is found that the number of blocks has increased, the subsequent block to the last block of the file are processed without compression. When the number of blocks has not increased, i.e., when the value (the block count) of the block counter is smaller than the block number (the table last block) n of the rearmost block (NO route from step C160), the process returns to step C40.

When the block is the last block of the series of blocks included in the data field (YES route from C150), the process proceeds to step C220 and then the processing ends.

When the result of the checking of the entry in the management table T indicates that the block is a block to be compressed (YES route from C40), the process proceeds to step C50 in which the migration processing unit 23 first updates the patrol pointer. More specifically, the value of the block counter is set for the patrol pointer to thereby update the patrol pointer.

Next, in step C60, the migration processing unit 23 calculates a compression ratio for, in the data field, the block specified by the block counter. In step C70, the migration processing unit 23 compares the calculated compression ratio with the certain threshold (90%) to thereby determine in which of a compressed state or an uncompressed state the block is to be stored on the recording tape 33.

When the compression ratio is higher than or equal to the threshold (YES route from C70), the process proceeds to step C120.

When the compression ratio is lower than the threshold (NO route from step C70), the process proceeds to step C80 in which the data-save processing unit 231 saves the block to the recording tape 33 in a compressed state. In step C90, with respect to the compressed/uncompressed state in the entry associated with the data and registered in the management table T, the migration processing unit 23 sets "0" indicating "compressed" in association with the block, thereby updating the management table T.

Thereafter, in step C100, the block counter is incremented (i.e., Block Count+1). In step C110, it is checked whether or not the block is the last block of the series of blocks included in the data field. That is, it is checked whether or not the block counter matches the block number n of the rearmost block of the series of blocks.

When the block is not the last block of the series of blocks included in the data field (NO route from step C110), the process returns to step C50. When the block is the last block of the series of blocks included in the data field (YES route from C110), the process proceeds to step C220 and then the processing ends.

As described above, the migration processing unit 23 has a function (such as the compression-ratio calculating unit 203) for calculating a compression ratio for each block, a function (such as the determining unit 205) for comparing the calculated compression ratio with the threshold, and a function (such as the management-table creating unit 206) for updating the management table T.

The CPU of the layer controller 20 executes a data processing program to thereby cause it to function as the write processing unit 21, the patrol processing unit 22, and the migration processing unit 23.

The program (the data processing program) for realizing the functions of the write processing unit 21, the patrol processing unit 22, and the migration processing unit 23 is supplied in the form of a computer-readable recording medium, such as a flexible disk, a CD (such as CD-ROM, CD-R, or CD-RW), a DVD (such as DVD-ROM, DVD-RAM, DVD-R, DVD+R, DVD-RW, DVD+RW, or HD DVD), a Blu-ray disc, an optical disk, or a magneto-optical disk. A computer then reads the program from the recording medium, transfers the read program to an internal storage device or an external storage device, and stores it therein. The program may also be pre-stored on, for example, a storage device (a recording medium), such as a magnetic disk, an optical disk, or a magneto-optical disk and may be supplied to the computer from the storage device through a communication path.

For realizing the functions of the write processing unit 21, the patrol processing unit 22, and, the migration processing unit 23, the program stored in the internal storage device (e.g., a RAM or ROM (not illustrated) in the present embodiment) is executed by a microprocessor (a CPU in the present embodiment) of the computer. In this case, the program recorded on the recording medium may be read by the computer for execution.

In the present embodiment, the term "computer" in the present embodiment refers to a concept including hardware and an operating system, the hardware operating under the control of the operating system. When the hardware is operable on an application program without use of the operating system, the hardware itself corresponds to the computer. The hardware has at least a microprocessor, such as a CPU, and means for reading the computer program recorded on the recording medium. In the present embodiment, the layer controller 20 has a function of the computer.

For a job performed on the same data for the second or subsequent time, the virtual tape library system 1 according to one example of the present embodiment allows a compression/uncompression determination for each block to be made by referring to the management table T, without calculating a compression ratio for the block. Thus, the write processing for writing data to the disk array 24 can be sped up and the load of the layer controller 20 can also be reduced. In particular, at the point when the header field of data is read, the compression/uncompression determination for each block can be made, so that the data write processing can be sped up.

Similarly, in the migration processing for moving data in the disk array 24 to the recording tape 33, it is possible to speed up the processing for writing (saving) the data to the recording tape 33 by referring to the management table T and it is also possible to reduce the load of the layer controller 20.

The compression/uncompression processing can be performed for each block of the data. As a result, the data size can be reduced and the disk array 24 and the recording tape 33 can be operated with efficiency.

In addition, even when data stored in the disk array 24 is modified after the management table T is created, performing the patrol processing allows information in the management table T to be matched with the state of the modified data and also allows the data write processing performance and the save processing to be increased.

Even if the patrol processing is terminated for some reason, when it is determined during the migration processing that the patrol processing is not completed, the management table T is updated while the migration processing of data is performed. This arrangement allows uncompleted patrol processing to be completed, thereby enhancing convenience.

During data writing or saving, the block whose data compression ratio has become higher than the threshold to the last block of a file are processed without compression. When an increase in the number of blocks is found when the same file is written for the second time, the subsequent block to the last block of a file are processed without compression. As a result of writing the blocks without compression, the blocks can be stored in an unprocessed state and the reliability of the data is improved.

The technology disclosed herein is not limited to the above-described embodiment and can be implemented in various modifications without departing from the scope of the embodiment.

The embodiment disclosed above can also be implemented and manufactured by those skilled in the art.

For example, although the compressed/uncompressed state, the patrol pointer, and the last block with respect to data are registered as an entry in the management table T in the above-described embodiment, the management scheme is not limited thereto and may be realized by any other scheme.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data processing apparatus for recording a file having a plurality of blocks into a storage device that is a virtual tape library, the data processing apparatus comprising:
   a processor to control the data processing apparatus according to a process including:
      performing a write processing when receiving the file that is written into the storage device from a higher level device, the write processing including:
         calculating a compression ratio of each of the blocks of the file, in sequence, from a first block of the file toward a last block of the file,
         comparing the calculated compression ratio of each of the blocks of the file with a threshold,
         determining whether each of the blocks of the file is to be compressed based on a result of the comparison,
         recording each of the blocks of the file on the storage device in a compressed or uncompressed state corresponding to each of the blocks of the file on a basis of a result of the determination and recording in an uncompressed state consecutive blocks of the file from one of the blocks that is determined to be uncompressed to the last block of the file when determining that the one of the blocks of the file is to be uncompressed based on the result of the determination,
         creating a management information in association with data identification information for identifying the file, the management information including state information indicating a compressed or uncompressed state corresponding to each of the blocks, and
         storing the created management information in a memory, and
      performing a patrol processing after the write processing is completed, the patrol processing including:
         recalculating a compression ratio of each of the consecutive blocks recorded in the uncompressed state of the file based on the compression ratio calculated by the write processing,
         comparing the recalculated compression ratio of each of the consecutive blocks recorded in the uncompressed state of the file based on the compression ratio calculated by the write processing with the threshold,
         determining whether each of the consecutive blocks recorded in the uncompressed state of the file based on the compression ratio calculated by the write processing is to be compressed or not based on a result of the comparison of the patrol processing, and
         updating the management information including state information indicating a compressed or uncompressed state based on a result of the determination of the patrol processing.

2. The data processing apparatus according to claim 1, further comprising:
   receiving the file having data identification information for identifying the file transmitted from the higher level device;
   checking whether the management information corresponding to the data identification information of the file received from the higher level device is stored in the memory, by comparing the received data identification information with the data identification information associated with the management information stored in the memory;
   recording each of the blocks of the received file to the storage device in a compressed or uncompressed state corresponding to each of the blocks of the file in accordance with the state information in the management information, when a result of the checking indicates that the management information corresponding to the received data identification information is stored in the memory.

3. The data processing apparatus according to claim 1, further comprising:
   referring to, during migration processing for moving the file stored in the storage device to a recording medium, the management information corresponding to the file; and
   recording each block of the file stored in the storage device to the recording medium in a compressed or uncompressed state corresponding to each of the blocks of the file in accordance with the state information in the management information.

4. A method for recording a file having a plurality of blocks into a storage device that is a virtual tape library by a computer, the method comprising:
   receiving the file that is written into the storage device from a higher level device;
   performing a write processing when receiving the file that is written into the storage device from a higher level device, the write processing including:
      calculating a compression ratio of each of the blocks of the file, in sequence, from a first block of the file toward a last block of the file,
      comparing the calculated compression ratio of each of the blocks of the file with a threshold,
      determining whether each of the blocks of the file is to be compressed based on a result of the comparison,
      recording each of the blocks of the file in the storage device in a compressed or uncompressed state corresponding to each of the blocks of the file on a basis of a result of the determination and recording in an uncompressed state consecutive blocks of the file from the one of the blocks that is determined to be uncompressed to the last block of the file when determining that one of the blocks of the file is to be uncompressed based on the result of the determination,
      creating a management information associated with data identification information for identifying the file, the management information including state information indicating a compressed or uncompressed state corresponding to each of the blocks of the file, and
      storing the created management information in a memory; and performing a patrol processing when receiving an unload command after the write processing is completed, the patrol processing including:
recalculating a compression ratio of each of the consecutive blocks recorded in the uncompressed state of the file based on the compression ratio calculated by the write processing,
comparing the recalculated compression ratio of each of the consecutive blocks recorded in the uncompressed state of the file based on the compression ratio calculated by the write processing with the threshold,
determining whether each of the consecutive blocks recorded in the uncompressed state of the file base on the compression ratio calculated by the write processing is to be compressed or not based on a result of the comparison of the patrol processing, and
updating the management information including state information indicating a compressed or uncompressed state based on a result of the determination of the patrol processing.

5. The method according to claim 4, further comprising:
receiving the file having data identification information for identifying the file transmitted from the higher level device;
checking whether the management information corresponding to the received data identification information of the file transmitted from the higher level device is stored in the memory by comparing the received data identification information with the data identification information associated with the management information stored in the memory; and
recording each of the blocks of the received file in the storage device in a compressed or uncompressed state corresponding to each of the blocks of the file in accordance with the state information in the management information, when a result of the checking indicates that the management information corresponding to the received data identification information is stored in the memory.

6. The method according to claim 4, further comprising:
referring to the management information corresponding to the file, during migration processing for moving the file stored in the storage device to a recording medium; and
recording the file stored in the storage device to the recording medium in a compressed or uncompressed state corresponding to each of the blocks of the file in accordance with the state information in the management information.

7. The data processing apparatus according to claim 1,
wherein the file received from the higher level device is recorded in the storage device in a tape format having at least a file name,
wherein the data identification information has at least the file name, and
wherein the processor to control the data processing apparatus according to a process includes:
receiving a file having data identification information from the higher level device,
checking whether the management information corresponding to the data identification information of the received file is stored in the memory, by comparing the data identification information of the received file with the data identification information in the management information stored in the memory,
determining whether the state information corresponding to each of the blocks of the received file indicates a compressed state or an uncompressed state when a result of the checking whether the management information corresponding to the data identification information of the received file is stored in the memory indicates that the management information corresponding to the data identification information of the received file is stored in the memory,
when determining that the state information corresponding to a block of the received file indicates the compressed state, calculating a compression ratio of the block, whose state information indicates the compressed state, of the received file,
comparing the calculated compression ratio of the block, whose state information indicates the compressed state, of the received file with the threshold,
recording the block, whose state information indicates the compressed state, of the received file into the storage device in a compressed state or in an uncompressed state based on a result of the comparison,
updating the state information in the management information corresponding to the block, whose state information indicates the compressed state, of the received file into an uncompressed state when a result of the comparison indicates an uncompressed state, and
when determining that the state information corresponding to a block of the received file indicates the uncompressed state, recording the block, whose state information indicates the uncompressed state, of the received file into the storage device in the uncompressed state.

* * * * *

UNITED STATES PATENT AND TRADEMARK OFFICE
CERTIFICATE OF CORRECTION

| | |
|---|---|
| PATENT NO. | : 8,904,103 B2 |
| APPLICATION NO. | : 13/291484 |
| DATED | : December 2, 2014 |
| INVENTOR(S) | : Yukio Taniyama |

It is certified that error appears in the above-identified patent and that said Letters Patent is hereby corrected as shown below:

In the Claims

Column 23, lines 1-2, In Claim 4, after "processing" delete "when receiving an unload command".

Signed and Sealed this
Fifth Day of May, 2015

Michelle K. Lee
*Director of the United States Patent and Trademark Office*